(12) United States Patent
Karatsu et al.

(10) Patent No.: US 7,360,305 B2
(45) Date of Patent: Apr. 22, 2008

(54) METHOD FOR MANUFACTURING MULTI-LAYERED CERAMIC ELECTRONIC COMPONENT

(75) Inventors: Masahiro Karatsu, Tokyo (JP); Shigeki Sato, Tokyo (JP); Masaaki Kanasugi, Tokyo (JP)
n

(73) Assignee: TDK Corporation, Tokyo (JP)

( * ) Notice: Subject to any disclaimer, the term of this patent is extended or adjusted under 35 U.S.C. 154(b) by 201 days.

(21) Appl. No.: 10/550,713

(22) PCT Filed: Mar. 31, 2004

(86) PCT No.: PCT/JP2004/004729

§ 371 (c)(1),
(2), (4) Date: Sep. 23, 2005

(87) PCT Pub. No.: WO2004/088685

PCT Pub. Date: Oct. 14, 2004

(65) Prior Publication Data

US 2007/0017091 A1    Jan. 25, 2007

(30) Foreign Application Priority Data

Mar. 31, 2003   (JP) .............................. 2003-096090

(51) Int. Cl.
*H05K 3/36* (2006.01)
(52) U.S. Cl. .................. 29/830; 821/25.42; 821/592.1; 821/831; 156/234
(58) Field of Classification Search ............... 29/25.01, 29/25.02, 25.03, 25.41, 25.42, 830, 831, 29/592.1; 156/89.12, 233–237; 264/614, 264/615; 361/313
See application file for complete search history.

(56) References Cited

U.S. PATENT DOCUMENTS

| | | | |
|---|---|---|---|
| 5,179,773 A * | 1/1993 | Monsees et al. | 29/25.42 |
| 5,808,856 A * | 9/1998 | Bischoff et al. | 361/313 |
| 6,245,171 B1 * | 6/2001 | Natarajan et al. | 156/89.12 |
| 6,607,690 B2 * | 8/2003 | Anahara et al. | 264/614 |

FOREIGN PATENT DOCUMENTS

| | | |
|---|---|---|
| JP | 3-96207 | 4/1991 |
| JP | 4-280614 | 10/1992 |
| JP | 4-282812 | 10/1992 |
| JP | 5-62860 | 3/1993 |
| JP | 6-72760 | 3/1994 |

(Continued)

*Primary Examiner*—Donghai D. Nguyen
(74) *Attorney, Agent, or Firm*—Seed IP Law Group PLLC

(57) ABSTRACT

A method for manufacturing a multi-layered ceramic electronic component includes positioning a multi-layered unit including a release layer, an electrode layer and a ceramic green sheet formed on a support sheet in such a manner that the surface of the multi-layered unit is located on a base substrate and a step of pressing the multi-layered unit toward the base substrate, thereby laminating the multi-layered unit on the base substrate, and employs as the base substrate a base substrate having such surface roughness as to include per 0.01 mm² thereof not more than one protrusion that can penetrate the ceramic green sheet of the multi-layered unit laminated on the base substrate to half or more the thickness of the ceramic green sheet and include per 100 mm² thereof not more than one protrusion that can completely penetrate the ceramic green sheet.

14 Claims, 11 Drawing Sheets

FOREIGN PATENT DOCUMENTS

| | | |
|---|---|---|
| JP | 06072760 | 3/1994 |
| JP | 7-312326 | 11/1995 |
| JP | 8-130152 | 5/1996 |
| JP | 11-238646 | 8/1999 |
| JP | 2000-315618 | 11/2000 |
| JP | 2000-331865 | 11/2000 |
| JP | 2001-023853 | 1/2001 |
| JP | 2001-044065 | 2/2001 |
| JP | 2001-162737 | 6/2001 |
| JP | 2001-237140 | 8/2001 |
| JP | 2001237140 | 8/2001 |
| JP | 2002-43164 | 2/2002 |
| JP | 2002043164 | 2/2002 |
| JP | 3306814 | 5/2002 |
| JP | 2002-343674 | 11/2002 |
| JP | 2003-059759 | 2/2003 |

* cited by examiner

METHOD FOR MANUFACTURING MULTI-LAYERED CERAMIC ELECTRONIC COMPONENT

BACKGROUND OF THE INVENTION

The present invention relates to a method for manufacturing a multi-layered ceramic electronic component, and particularly to a method for manufacturing the multi-layered ceramic electronic component which can reliably prevent a multi-layered unit including a ceramic green sheet and an electrode layer from being damaged and efficiently laminate a desired number of the multi-layered units, thereby manufacturing the multi-layered ceramic electronic component.

DESCRIPTION OF THE PRIOR ART

Recently, the need to downsize various electronic devices makes it necessary to downsize the electronic components incorporated in the devices and improve the performance thereof. Also in multi-layered ceramic electronic components, such as multi-layered ceramic capacitors, it is strongly required to increase the number of layers and make the laminated unit thinner.

When a multi-layered ceramic electronic component as typified by a multi-layered ceramic capacitor is to be manufactured, ceramic powders, a binder such as an acrylic resin, a butyral resin or the like, a plasticizing agent such as a phthalate ester, glycol, adipate ester, phosphate ester or the like, and an organic solvent such as toluene, methyl ethyl ketone, acetone or the like are mixed and dispersed, thereby preparing a dielectric paste.

The dielectric paste is then applied onto a support sheet made of polyethylene terephthalate (PET), polypropylene (PP) or the like using an extrusion coater, a gravure coater or the like to form a coating layer and the coating layer is heated to dryness, thereby fabricating a ceramic green sheet.

Further, an electrode paste such as of nickel is printed onto the ceramic green sheet in a predetermined pattern using a screen printer and is dried to form an electrode layer.

When the electrode layer has been formed, the ceramic green sheet on which the electrode layer is formed is peeled off from the support sheet to form a multi-layered unit including the ceramic green sheet and the electrode layer. Then, a ceramic green chip is formed by laminating a desired number of the multi-layered units to form the laminated body, pressing the laminated body and dicing the laminated body.

Finally, the binder is removed from the green chip, the green chip is baked and an external electrode is formed, thereby completing a multi-layered ceramic electronic component such as a multi-layered ceramic capacitor.

At present, the need to downsize electronic components and improve the performance thereof makes it necessary to set the thickness of the ceramic green sheet determining the spacing between layers of a multi-layered ceramic capacitor to be equal to or smaller than 3 µm or 2 µm and to laminate three hundred or more multi-layered units each including a ceramic green sheet and an electrode layer.

As a result, in the case of laminating the required number of multi-layered units each including a ceramic green sheet and an electrode layer on the outer layer of a multi-layered ceramic capacitor in a conventional manner, the multi-layered unit first laminated on the outer layer is pressed three hundred times or more and is liable to be damaged. Therefore, it is necessary to laminate multi-layered units fifty by fifty, for example, to form multi-layered blocks and laminate a plurality of multi-layered blocks on the outer layer of a multi-layered ceramic capacitor.

In the case of laminating the required number of multi-layered units each including a ceramic green sheet and an electrode layer on the outer layer of a multi-layered ceramic capacitor, the multi-layered units can be laminated by fixing the outer layer on a die. However, in the case of laminating multi-layered units to each other, when a multi-layered unit including a ceramic green sheet and an electrode layer is fixed on a die and multi-layered units are laminated thereonto, there arises a high risk of damaging the multi-layered units.

SUMMARY OF THE INVENTION

It is therefore an object of the present invention to provide a method for manufacturing a multi-layered ceramic electronic component which can reliably prevent a multi-layered unit including a ceramic green sheet and an electrode layer from being damaged and efficiently laminate a desired number of the multi-layered units, thereby manufacturing the multi-layered ceramic electronic component.

The above object of the present invention can be accomplished by a method for manufacturing a multi-layered ceramic electronic component comprising steps of positioning a multi-layered unit formed on a support sheet and including a release layer, an electrode layer and a ceramic green sheet so that a surface of the multi-layered unit is located on a base substrate, pressing the multi-layered unit toward the base substrate and laminating the multi-layered unit on the base substrate, wherein the base substrate has such surface roughness as to include per 0.01 mm$^2$ thereof not more than one protrusion that can penetrate the ceramic green sheet of the multi-layered unit laminated on the base substrate to half or more the thickness of the ceramic green sheet and include per 100 mm$^2$ thereof not more than one protrusion that can completely penetrate the ceramic green sheet.

According to the present invention, since the multi-layered ceramic electronic component is manufactured by positioning a multi-layered unit formed on a support sheet and including a release layer, an electrode layer and a ceramic green sheet so that a surface of the multi-layered unit is located on a base substrate, pressing the multi-layered unit toward the base substrate and laminating the multi-layered unit on the base substrate, it is possible to effectively prevent the multi-layered units from being damaged when a multi-layered ceramic electronic component is manufactured by laminating a desired number of multi-layered units.

Further, a base substrate normally contains fillers to make it easy to handle and the fillers cause protrusions to be formed on the surface of the base substrate. Therefore, in the case where a ceramic green sheet is made thin, when the multi-layered unit is pressed onto the base substrate and laminated thereon, there are risks of the ceramic green sheet being damaged by the protrusions formed on the surface of the base substrate and short-circuit failure occurring in a multi-layered ceramic electronic component fabricated by laminating a number of multi-layered units. However, according to the present invention, the base substrate has such surface roughness as to include per 0.01 mm$^2$ thereof not more than one protrusion that can penetrate the ceramic green sheet laminated on an agglutinant layer to half or more the thickness of the ceramic green sheet and include per 100 mm$^2$ thereof not more than one protrusion that can completely penetrate the ceramic green sheet. Therefore, even in the case where the ceramic green sheet is made thin, it is possible when pressing the multi-layered unit onto the base substrate and laminating it thereon to effectively prevent the ceramic green sheet from being damaged by protrusions formed on the surface of the base substrate and short-circuit failure from occurring in a multi-layered ceramic electronic component fabricated by laminating a number of multi-layered units.

In the present invention, a protrusion that can penetrate the ceramic green sheet to half or more the thickness of the ceramic green sheet means a protrusion having a height capable of penetrating the ceramic green sheet to half or more the thickness of the ceramic green sheet and does not necessary mean that the protrusion actually penetrates the ceramic green sheet to half or more its thickness.

Further, in the present invention, a protrusion which can completely penetrate the ceramic green sheet means a protrusion having a height capable of completely penetrating the ceramic green sheet and does not necessary mean that the protrusion actually completely penetrates the ceramic green sheet.

In a preferred aspect of the present invention, the base substrate has such surface roughness as to include per 0.01 $mm^2$ thereof not more than one protrusion that can penetrate the ceramic green sheet laminated on an agglutinant layer to half or more the thickness of the ceramic green sheet, include per 100 $mm^2$ thereof not more than one protrusion that can completely penetrate the ceramic green sheet, and include per 1 $mm^2$ thereof not more than one protrusion that can penetrate the ceramic green sheet to a depth of 0.3 μm or more.

In the present invention, a protrusion which can penetrate the ceramic green sheet to a depth of 0.3 μm or more means a protrusion having a height capable of penetrating the ceramic green sheet to a depth of 0.3 μm or more and does not necessary mean that the protrusion actually penetrates the ceramic green sheet to a depth of 0.3 μm or more.

In a preferred aspect of the present invention, an agglutinant layer is formed on the base sheet and the multi-layered unit is positioned on the base substrate so that the surface of the ceramic green sheet comes into contact with the surface of the agglutinant layer and pressed toward the base substrate, thereby laminating the multi-layered unit on the base substrate.

In a preferred aspect of the present invention, the agglutinant layer is formed on the surface of the base sheet in such a manner that the bonding strength between itself and the base substrate is higher than the bonding strength between the support sheet and the release layer and lower than the bonding strength between itself and the ceramic green sheet.

According to this preferred aspect of the present invention, since the agglutinant layer is formed on the surface of the base sheet in such a manner that the bonding strength between itself and the base substrate is higher than the bonding strength between the support sheet and the release layer and lower than the bonding strength between itself and the ceramic green sheet, in the case where the multi-layered unit is formed by laminating the release layer, the electrode layer and the ceramic green sheet on the support substrate in this order and the multi-layered unit is positioned on the base substrate so that the surface of the ceramic green sheet comes into contact with the surface of the agglutinant layer, thereby laminating it on the base substrate, it is possible to easily peel off the support sheet from the release layer of the multi-layered unit laminated on the base substrate and it is therefore possible to effectively laminate another multi-layered unit on the release layer of the multi-layered units laminated on the base substrate.

Moreover, according to this preferred aspect of the present invention, since the agglutinant layer is formed on the surface of the base substrate in such a manner that the bonding strength between itself and the support substrate is lower the bonding strength between itself and the ceramic green sheet, in the case where the multi-layered unit is formed by laminating the release layer, the electrode layer and the ceramic green sheet on the support substrate in this order and the multi-layered unit is positioned on the base substrate so that the surface of the ceramic green sheet comes into contact with the surface of the agglutinant layer, thereby laminating it on the base substrate, it is possible to peeling off and remove only the base substrate from the release layer while the agglutinant layer is bonded to the ceramic green sheet by repeating a step of peeling off the support sheet from the release layer of the multi-layered unit laminated on the base substrate and laminating another multi-layered unit including an adhesive layer formed on the ceramic green sheet on the release layer of the multi-layered unit laminated on the base substrate via the agglutinant layer to fabricate a multi-layered block including a predetermined number of multi-layered units laminated on the base substrate and laminating the multi-layered block on the outer layer of a multi-layered ceramic capacitor or the like. Therefore, when a multi-layered block is to be further laminated on the multi-layered block laminated on the outer layer of a multi-layered ceramic capacitor or the like, since it is unnecessary to form an adhesive layer on the multi-layered block to be laminated, it is possible to efficiently manufacture a multi-layered ceramic electronic component.

In another preferred aspect of the present invention, the agglutinant layer is formed on the surface of the base substrate in such a manner that the bonding strength between itself and the support substrate is higher than the bonding strength between the support sheet and the ceramic green sheet and lower than the bonding strength between itself and the release layer.

According to this preferred aspect of the present invention, since the agglutinant layer is formed on the surface of the base sheet in such a manner that the bonding strength between itself and the support substrate is higher than the bonding strength between the support sheet and the ceramic green sheet and lower than the bonding strength between itself and the release layer, in the case where the multi-layered unit is formed by laminating the ceramic green sheet and the electrode and release layers on the support substrate in this order and the multi-layered unit is positioned on the base substrate so that the surface of the release layer comes into contact with the surface of the agglutinant layer, thereby laminating it on the base substrate, it is possible to easily peel off the support sheet from the release layer of the multi-layered unit laminated on the base substrate and it is therefore possible to efficiently laminate another multi-layered unit on the release layer of the multi-layered units laminated on the base substrate.

Further, according to this preferred aspect of the present invention, since the agglutinant layer is formed on the surface of the base sheet in such a manner that the bonding strength between itself and the support substrate is higher than the bonding strength between the support sheet and the ceramic green sheet and lower than the bonding strength between itself and the release layer, in the case where the multi-layered unit is formed by laminating the ceramic green sheet and the electrode and release layers on the support substrate in this order and the multi-layered unit is positioned on the base substrate so that the surface of the release layer comes into contact with the surface of the agglutinant layer, thereby laminating it on the base substrate, it is possible to peel off and remove only the base substrate from the ceramic green sheet while the agglutinant layer is bonded to the release layer by repeating a step of peeling off the support sheet from the ceramic green sheet of the multi-layered unit laminated on the base substrate and laminating another multi-layered unit including an adhesive layer formed on the release layer on the ceramic green sheet of the multi-layered unit laminated on the base substrate via the agglutinant layer to fabricate a multi-layered block including a predetermined number of multi-layered units laminated on the base substrate and laminating the multi-layered block on the outer layer of a multi-layered ceramic capacitor or the like. Therefore, when a multi-layered block is to be further laminated on the multi-layered block laminated on the outer layer of a multi-layered ceramic capacitor or the like, since it is unnecessary to form an adhesive layer on the multi-layered block to be laminated, it is possible to efficiently manufacture a multi-layered ceramic electronic component.

In the present invention, the dielectric paste used for forming the ceramic green sheet is normally prepared by kneading a dielectric raw material and an organic vehicle obtained by dissolving a binder into an organic solvent.

The dielectric raw material can be selected from among various compounds capable of forming a composite oxide or oxide, such as a carbonate, nitrate, hydroxide, organic metallic compound and the like and mixtures thereof. The dielectric raw material is normally used in the form of a powder whose average particle diameter is about 0.1 μm to about 3.0 μm. The particle diameter of the dielectric raw material is preferably smaller than the thickness of the ceramic green sheet.

The binder used for preparing the organic vehicle is not particularly limited and various known binders such as ethylcellulose, polyvinyl butyral, acrylic resin can be used as the binder for preparing the organic vehicle. However, in order to make the ceramic green sheet thinner, a butyral system resin such as polyvinyl butyral is preferably employed.

The organic solvent used for preparing the organic vehicle is not particularly limited and terpineol, butyl carbitol, acetone, toluene and the like can be used as the organic solvent used for preparing the organic vehicle.

In the present invention, the dielectric paste may be prepared by kneading the dielectric raw material and a vehicle prepared by dissolving a water soluble binder therein.

The water soluble binder used for preparing the dielectric paste is not particularly limited and polyvinyl alcohol, methylcellulose, hydroxyethylcellulose, water soluble acrylic resin, emulsion and the like may be used as the water soluble binder.

The amounts of the respective constituents contained in the dielectric paste are not particularly limited and the dielectric paste may be prepared so as to contain about 1 weight % to about 5 weight % of a binder and about 10 weight % to about 50 weight % of a solvent, for example.

As occasion demands, the dielectric paste may contain additives selected from among various dispersing agents, plasticizing agents, dielectric materials, accessory ingredient compounds, glass frits, insulating materials and the like. In the case of adding these additives to the dielectric paste, it is preferable to set the total content to be equal to or less than about 10 weight %. In the case where a butyral system resin is employed as the binder resin, it is preferable to set the content of the plasticizing agent to be about 25 weight parts to about 100 weight parts with respect to 100 weight parts of the binder. When the content of the plasticizing agent is too small, the ceramic green sheet tends to become brittle and on the, other hand, when the content of the plasticizing agent is too large, the plasticizing agent oozes out and the ceramic green sheet becomes hard to handle.

In the present invention, a ceramic green sheet is fabricated by applying the dielectric paste onto a first support sheet to form a coating layer and drying the coating layer.

The dielectric paste is applied onto the first support sheet using an extrusion coater or wire bar coater, thereby forming a coating layer.

As the first support sheet, a polyethylene terephthalate is employed, for example, and the surface of the first support sheet is coated with a silicon resin, an alkyd resin or the like in order to improve the releasability thereof. The thickness of the first support sheet is not particularly limited but it is preferable for the first support sheet to have a thickness of about 5 μm to about 100 μm.

In the present invention, the first support sheet preferably has such roughness as to include per 0.01 $mm^2$ thereof not more than one protrusion that can penetrate the ceramic green sheet formed on the surface thereof to half or more the thickness of the ceramic green sheet and include per 100 $mm^2$ thereof not more than one protrusion that can completely penetrate the ceramic green sheet.

The thus formed coating layer is dried at a temperature of about 50° C. to about 100° C. for about 1 to about 20 minutes, whereby a ceramic green sheet is formed on the first support sheet.

In the present invention, the thickness of the ceramic green sheet after drying is preferably equal to or thinner than 3 μm and more preferably equal to or thinner than 1.5 μm.

In the present invention, when an electrode layer of a multi-layered unit is to be formed, a second support sheet is prepared independently of the first support sheet and the second support sheet is coated with an electrode paste using a screen printing machine or a gravure printing machine, thereby forming an electrode layer.

As the second support sheet, a polyethylene terephthalate is employed, for example, and the surface of the second support sheet is coated with a silicon resin, an alkyd resin or the like in order to improve the releasability thereof. The thickness of the second support sheet is not particularly limited and may be the same as or different from that of the first support sheet on which the ceramic green sheet is formed but it is preferable for the second support sheet to have a thickness of about 5 μm to about 100 μm.

In the present invention, the second support sheet preferably has such surface roughness as to include per 0.01 $mm^2$ thereof not more than one protrusion that can penetrate the ceramic green sheet to half or more the thickness of the ceramic green sheet when the electrode layer and the ceramic green sheet are bonded to each other via an adhesive layer described later and include per 100 $mm^2$ thereof not more than one protrusion that can completely penetrate the ceramic green sheet when the electrode layer and the ceramic green sheet are bonded to each other via the adhesive layer.

In the present invention, prior to forming an electrode layer on the second support sheet, a dielectric paste is first prepared and applied onto the second support sheet, whereby a release layer is formed on the second support sheet.

The dielectric paste for forming the release layer preferably contains dielectric particles having the same composition as that of dielectric particles contained in the ceramic green sheet.

The dielectric paste for forming the release layer contains, in addition to the dielectric particles, a binder, and, optionally, a plasticizing agent and a release agent. The size of the dielectric particles may be the same as that of the dielectric particles contained in the ceramic green sheet but is preferably smaller than that of the dielectric particles contained in the ceramic green sheet.

Illustrative examples of binders usable for forming the release layer include acrylic resin, polyvinyl butyral, polyvinyl acetal, polyvinyl alcohol, polyolefin, polyurethane, polystyrene, copolymer thereof, and emulsion thereof.

The binder contained in the dielectric paste for forming the release layer may or may not belong to the same binder group as that the binder contained in the ceramic green sheet belongs to but it preferably belongs to the same binder group as that the binder contained in the ceramic green sheet belongs to.

The binder contained in dielectric paste for forming the release layer contains the binder preferably in an amount of about 2.5 weight % to about 200 weight % with respect to 100 weight parts of the dielectric particles, more preferably in an amount of about 5 weight parts to about 30 weight parts, most preferably in an amount of about 8 weight parts to about 30 weight parts.

The plasticizing agent contained in the dielectric paste for forming the release layer is not particularly limited and illustrative examples thereof include phthalate ester, adipic acid, phosphate ester, glycols and the like. The plasticizing agent contained in the dielectric paste for forming the release layer may or may not belong to the same plasticizing agent group as that the plasticizing agent contained in the ceramic green sheet belongs to.

The dielectric paste for forming the release layer contains the plasticizing agent preferably in an amount of about 0 weight % to about 200 weight % with respect to 100 weight parts of the binder, more preferably in an amount of about 20 weight parts to about 200 weight parts, most preferably in an amount of about 50 weight parts to about 100 weight parts.

The releasing agent contained in the dielectric paste for forming the release layer is not particularly limited and illustrative examples thereof include paraffin, wax, silicone oil and the like.

The dielectric paste for forming the release layer contains the releasing agent preferably in an amount of about 0 weight % to about 100 weight % with respect to 100 weight parts of the binder, more preferably in an amount of about 2 weight parts to about 50 weight parts, most preferably in an amount of about 5 weight parts to about 20 weight parts.

In the present invention, it is preferable for the content ratio of the binder to the dielectric material contained in the release layer to be substantially equal to or lower than the content ratio of the binder to the dielectric material contained in the ceramic green sheet. Further, it is preferable for the content ratio of the plasticizing agent to the dielectric material contained in the release layer to be substantially equal to or higher than the content ratio of the plasticizing agent to the dielectric material contained in the ceramic green sheet. Moreover, it is preferable for the content ratio of the releasing agent to the dielectric material contained in the release layer to be higher than the content ratio of the releasing agent to the dielectric material contained in the ceramic green sheet.

In the case where the release layer having the above described composition is formed, even if the ceramic green sheet is very thin, the strength of the release layer can be lower than the breaking strength of the ceramic green sheet and it is therefore possible to reliably prevent the ceramic green sheet from being destroyed when the second support sheet is peeled off from the release layer.

The release layer is formed by applying the dielectric paste onto the second support sheet using a wire bar coater or the like.

The thickness of the release layer is preferably equal to or thinner than that of an electrode layer to be formed thereon, more preferably equal to or thinner than about 60% of the electrode layer thickness and most preferably equal to or thinner than about 30% of the electrode layer thickness.

After the release layer has been formed, it is dried at a temperature of about 50° C. to about 100° C. for about 1 to about 10 minutes.

After the release layer has been dried, an electrode layer which will form an inner electrode layer after baking is formed on the surface of the release layer in a predetermined pattern.

In the present invention, the electrode paste usable for forming the electrode layer is prepared by kneading a conductive material containing any of various conductive metals or alloys, any of various oxides which will form a conductive material containing any of various conductive metals or alloys after baking, an organic metal compound, resinate or the like, and an organic vehicle prepared by dissolving a binder in an organic solvent.

As the conductive material used for preparing the electrode paste, Ni, Ni alloy or the mixture thereof is preferably used. The shape of the conductive material is not particularly limited. The conductive material particles may have a spherical shape or a scale-like shape, or the conductive material may contain spherical conductive material particles and scale-like conductive material particles. The average particle diameter of the conductive material is not particularly limited but a conductive material having an average particle diameter of about 0.1 μm to about 2 μm is normally used for preparing the electrode paste and the conductive material having an average particle diameter of about 0.2 μm to about 1 μm is preferably used for preparing the electrode paste.

The binder for preparing the organic vehicle is not particularly limited ethylcellulose, acrylic resin, polyvinyl butyral, polyvinyl acetal, polyvinyl alcohol, polyolefin, polyurethane, polystyrene and the copolymer thereof can be used for preparing the organic vehicle and among these, a butyral system such as polyvinyl butyral is particularly preferable for preparing the organic vehicle.

The electrode paste preferably contains the binder in an amount about 2.5 weight parts to about 20 weight parts with respect to 100 weight parts of the conductive material.

As the solvent, a known solvent such as terpineol, butyl carbitol, kerosene can be used. The content of the solvent is preferably about 20 weight % to about 55 weight % with respect to the weight of the electrode paste.

In order to improve adhesion property, it is preferable for the electrode paste to contain a plasticizing agent.

The plasticizing agent contained in the electrode paste is not particularly limited and illustrative examples thereof include phthalate ester such as benzyl butyl phthalate (BBP), adipic acid, phosphate ester, glycols and the like. The electrode paste contains the plasticizing agent preferably in an amount of about 10 weight % to about 300 weight % with respect to 100 weight parts of the binder, more preferably in an amount of about 10 weight parts to about 200 weight parts.

In the case where the amount of the plasticizing agent added to the electrode paste is too large, the strength of the electrode layer tends to be markedly lower.

The electrode layer is formed by printing the surface of the release layer formed on the second support sheet with the electrode paste using a screen printing machine or a gravure printing machine.

It is preferable to form the electrode layer so as to have a thickness of about 0.1 µm to about 5 µm and it is more preferable to form the electrode layer so as to have a thickness of about 0.1 µm to about 1.5 µm.

In the present invention, it is preferable to further print a dielectric paste on the surface of the release layer formed on the second support sheet where no electrode layer is formed using a screen printing machine or a gravure printing machine in a complementary pattern to that of the electrode layer, thereby forming a spacer layer.

It is possible to form the spacer layer on the surface of the release layer formed on the second support sheet in a complementary pattern to that of the electrode layer prior to forming the electrode layer.

In the present invention, the dielectric paste used for forming the spacer layer is prepared in a similar manner to that for preparing the dielectric paste for the ceramic green sheet.

The dielectric paste used for forming the spacer layer preferably contains dielectric particles having the same composition as that of the dielectric particles contained in the ceramic green sheet.

The dielectric paste used for forming the spacer layer preferably contains, in addition to the dielectric particles, a binder, and, optionally, a plasticizing agent and a release agent. The size of the dielectric particles may be the same as that of the dielectric particles contained in the ceramic green sheet but is preferably smaller than that of the dielectric particles contained in the ceramic green sheet.

Illustrative examples of binders usable for forming the spacer layer include acrylic resin, polyvinyl butyral, polyvinyl acetal, polyvinyl alcohol, polyolefin, polyurethane, polystyrene, copolymer thereof, and emulsion thereof.

The binder contained in dielectric paste for forming the spacer layer may or may not belong to the same binder group as that the binder contained in the ceramic green sheet belongs to but it preferably belongs to the same binder group as that the binder contained in the ceramic green sheet belongs to.

The binder contained in dielectric paste for forming the spacer layer contains the binder preferably in an amount of about 2.5 weight % to about 200 weight % with respect to 100 weight parts of the dielectric particles, more preferably in an amount of about 4 weight parts to about 15 weight parts, most preferably in an amount of about 6 weight parts to about 10 weight parts.

The plasticizing agent contained in the dielectric paste for forming the spacer layer is not particularly limited and illustrative examples thereof include phthalate ester, adipic acid, phosphate ester, glycols and the like. The plasticizing agent contained in the dielectric paste for forming the release layer may or may not belong to the same plasticizing agent group as that the plasticizing agent contained in the ceramic green sheet belongs to.

The dielectric paste for forming the spacer layer contains the plasticizing agent preferably in an amount of about 0 weight % to about 200 weight % with respect to 100 weight parts of the binder, more preferably in an amount of about 20 weight parts to about 200 weight parts, most preferably in an amount of about 50 weight parts to about 100 weight parts.

The releasing agent contained in the dielectric paste for forming the spacer layer is not particularly limited and illustrative examples thereof include paraffin, wax, silicone oil and the like.

The dielectric paste for forming the spacer layer contains the releasing agent preferably in an amount of about 0 weight % to about 100 weight % with respect to 100 weight parts of the binder, more preferably in an amount of about 2 weight parts to about 50 weight parts, most preferably in an amount of about 5 weight parts to about 20 weight parts.

In the present invention, it is preferable to form the electrode layer and the spacer layer so that $t_s/t_e$ is equal to or larger than 0.7 and equal to or smaller than 1.2, where $t_s$ is the thickness of the spacer layer and $t_e$ is the thickness of the electrode layer. It is more preferable to form them so that $t_s/t_e$ is equal to or larger than 0.8 and equal to or smaller than 1.2 and it is most preferable to form them so that $t_s/t_e$ is equal to or larger than 0.9 and equal to or smaller than 1.2.

The electrode layer and the spacer layer are dried at a temperature of about 70° C. to about 120° C. for about 5 to about 15 minutes. The drying conditions of the electrode layer and the spacer layer are not particularly limited.

The ceramic green sheet and the electrode and spacer layers are bonded via an adhesive layer transferred onto the ceramic green sheet or the electrode layer and the spacer layer and a third support sheet is prepared in order to form an adhesive layer.

As the third support sheet, a polyethylene terephthalate is employed, for example, and the surface of the third support sheet is coated with a silicon resin, an alkyd resin or the like in order to improve the releasability thereof. The thickness of the third support sheet is not particularly limited but it is preferable for the third support sheet to have a thickness of about 5 µm to about 100 µm.

In the present invention, in the case where the adhesive layer is transferred onto the surface of the ceramic green sheet, and the ceramic green sheet and the electrode and spacer layers are bonded via an adhesive layer, the third support sheet has such surface roughness as to include per $0.01 \text{ mm}^2$ thereof not more than one protrusion that can penetrate the ceramic green sheet to half or more the thickness of the ceramic green sheet when the adhesive layer is transferred onto the surface of the ceramic green sheet and include per $100 \text{ mm}^2$ thereof not more than one protrusion that can completely penetrate the ceramic green sheet when the adhesive layer is transferred onto the surface of the ceramic green sheet.

The adhesive layer is formed by coating the third support sheet with an adhesive agent solution.

In the present invention, the adhesive agent solution contains a binder, and, optionally, a plasticizing agent, a release agent and an antistatic agent.

The adhesive agent solution may contain dielectric particles having the same composition as that of dielectric particles contained in the ceramic green sheet. In the case where the adhesive agent solution contains dielectric particles, it is preferable for the ratio of the weight of the dielectric particles to the weight of the binder to be less than the ratio of the weight of the dielectric particles contained in the ceramic green sheet to the weight of the binder.

The binder contained in the adhesive agent solution preferably belongs to the same binder group as that the binder contained in the ceramic green sheet belongs to but it is not absolutely necessary for it to belong to the same binder group as that the binder contained in the ceramic green sheet belongs to.

The plasticizing agent contained in the adhesive agent solution preferably belongs to the same plasticizing agent group as that the plasticizing agent contained in the dielectric paste for forming the ceramic green sheet belongs to but it is not absolutely necessary for it to belong to the same plasticizing agent group as that the plasticizing agent contained in the dielectric paste for forming the ceramic green sheet belongs to.

The content of the plasticizing agent is preferably about 0 weight % to about 200 weight % with respect to 100 weight parts of the binder, more preferably about 20 weight parts to about 200 weight parts, and most preferably about 50 weight parts to about 100 weight parts.

In the present invention, the adhesive agent solution preferably contains an antistatic agent in an amount of 0.01 weight % to 15 weight % of the binder and more preferably contains an antistatic agent in an amount of 0.01 weight % to 10 weight % of the binder.

In the present invention, the antistatic agent contained in the adhesive agent solution is not particularly limited insofar as it is an organic solvent having a hygroscopic property and illustrative examples of the antistatic agent contained in the adhesive agent solution include ethylene glycol, polyethylene glycol, 2-3 butanediol, glycerin, an ampholytic surfactant such as an imidazoline system surfactant, a polyalkylene glycol derivative system surfactant and a carboxylic acid amidine salt system surfactant, and the like.

Among these, an ampholytic surfactant such as an imidazoline system surfactant, a polyalkylene glycol derivative system surfactant or a carboxylic acid amidine salt system surfactant is preferable since a small amount thereof can prevent static charge from being generated and enable peel-off of the third support sheet from the adhesive layer with a small releasing force, and an imidazoline system surfactant is particularly preferable since it enables peel-off the third support sheet from the adhesive layer with a very small releasing force.

The adhesive agent solution is applied onto the third support sheet using a bar coater, an extrusion coater, a reverse coater, a dip coater, a kiss coater or the like, thereby forming the adhesive layer so as to preferably have a thickness of about 0.02 μm to about 0.3 μm, more preferably have a thickness of about 0.02 μm to about 0.1 μm. In the case where the thickness of the adhesive layer is thinner than about 0.02 μm, the adhesion force is lowered and on the other hand, in the case where the thickness of the adhesive layer exceeds about 0.3 μm, defects (empty apaces) tend to be generated.

The adhesive layer is dried at a temperature between room temperature (25° C.) and about 80° C. for about 1 to about 5 minutes, for example. The drying conditions of the adhesive layer are not particularly limited.

The adhesive layer formed on the third support sheet is transferred onto the surfaces of the electrode layer and the spacer layer formed on the second support sheet or the surface of the ceramic green sheet formed on the first support sheet.

In the case where the adhesive layer is to be transferred onto the surfaces of the electrode layer and the spacer layer formed on the second support sheet, the adhesive layer is kept in contact with the surfaces of the electrode layer and the spacer layer formed on the second support sheet, and the adhesive layer and the electrode and spacer layers are pressed at a temperature of about 40° C. to about 100° C. under a pressure of about 0.2 MPa to about 15 MPa, preferably under a pressure of 0.2 MPa to about 6 MPa, whereby the adhesive layer is bonded onto the surfaces of the electrode layer and the spacer layer. Afterward, the third support sheet is peeled off from the adhesive layer.

When the adhesive layer is to be transferred, it is kept in contact with the surfaces of the electrode layer and the spacer layer formed on the second support sheet, and the adhesive layer, the electrode layer and spacer layer are pressed at a temperature of about 40° C. to about 100° C. under a pressure of about 0.2 MPa to about 15 MPa, preferably under a pressure of 0.2 MPa to about 6 MPa, whereby the adhesive layer is bonded onto the surface of the electrode layer and the spacer layer. Afterward, the third support sheet is peeled off from the adhesive layer.

In the case where the adhesive layer is to be transferred onto the surface of the ceramic green sheet formed on the first support sheet, the adhesive layer is kept in contact with the surface of the ceramic green sheet formed on the first support sheet and the adhesive layer and the ceramic green sheet are pressed at a temperature of about 40° C. to about 100° C. under a pressure of about 0.2 MPa to about 15 MPa, preferably under a pressure of 0.2 MPa to about 6 MPa, whereby the adhesive layer is bonded onto the surface of the ceramic green sheet. Afterward, the third support sheet is peeled off from the adhesive layer.

When the adhesive layer is transferred onto the surface of the ceramic green sheet, the first support sheet formed with the ceramic green sheet and the third support sheet formed with the adhesive layer may be pressed onto each other using a pressing machine or using a pair of pressure rollers but it is preferable to press the first support sheet and the third support sheet onto each other using a pair of pressure rollers.

Then, the ceramic green sheet and the electrode and spacer layers are bonded to each other via the adhesive layer.

The ceramic green sheet and the electrode and spacer layers are pressed at a temperature of about 40° C. to about 100° C. under a pressure of about 0.2. MPa to about 15 MPa, preferably under a pressure of 0.2 MPa to about 6 MPa, whereby the ceramic green sheet is bonded onto the electrode layer and spacer layer via the adhesive layer.

Preferably, the ceramic green sheet, the adhesive layer, and the electrode and spacer layers are pressed onto each other using a pair of pressure rollers and the ceramic green sheet and the electrode and spacer layers are bonded to each other via the adhesive layer.

In the case where the adhesive layer is transferred onto the surfaces of the electrode layer and the spacer layer, when the ceramic green sheet and the electrode and spacer layers have been bonded to each other via the adhesive layer, the first support sheet is peeled off from the ceramic green sheet.

A laminated body is thus obtained and is cut to a predetermined size, thereby fabricating a multi-layered unit including the release layer, the electrode layer, the spacer layer, the adhesive layer and the ceramic green sheet laminated on the second support sheet in this order.

On the other hand, in the case where the adhesive layer is transferred onto the surface of the ceramic green sheet, when the ceramic green sheet and the electrode and spacer layers have been bonded to each other via the adhesive layer, the second support sheet is peeled off from the release layer.

A laminated body is thus obtained and the laminated body is cut to a predetermined size, thereby fabricating a multi-layered unit including the ceramic green sheet, the adhesive layer, the electrode layer, and the spacer and release layers laminated on the second support sheet in this order.

A number of the thus fabricated multi-layered units are laminated via the adhesive layer, thereby fabricating a multi-layered block.

When a number of the multi-layered units are to be laminated, a base substrate formed with an agglutinant layer is first set on a substrate formed with a plurality of holes.

In the present invention, the material for forming the base substrate is not particularly limited but it is preferable to form the base substrate of a plastic material such as polyethylene, polypropylene, polycarbonate, polyphenylene ether and polyethylene terephthalate.

The thickness of the base substrate is not particularly limited insofar as it can support the multi-layered unit.

The base substrate is sucked with air via the plurality of holes formed in the substrate, thereby being fixed at a predetermined position on the substrate.

The agglutinant layer is formed by coating the base substrate with an agglutinant agent solution.

The agglutinant layer is formed by coating the base substrate with an agglutinant agent solution.

In the present invention, the agglutinant agent solution contains a binder and, optionally, a plasticizing agent, a release agent and an antistatic agent.

The agglutinant agent solution may contain dielectric particles having the same composition as that of dielectric particles contained in the ceramic green sheet. In the case where the agglutinant agent solution contains dielectric particles, it is preferable for the ratio of the weight of the dielectric particles to the weight of the binder to be less than the ratio of the weight of the dielectric particles contained in the ceramic green sheet to the weight of the binder.

The binder contained in the agglutinant agent solution preferably belongs to the same binder group as that the binder contained in the ceramic green sheet belongs to but it is not absolutely necessary for it to belong to the same binder group as that the binder contained in the ceramic green sheet belongs to.

The plasticizing agent contained in the agglutinant agent solution preferably belongs to the same plasticizing agent group as that the plasticizing agent contained in the dielectric paste for forming the ceramic green sheet belongs to but it is not absolutely necessary for it to belong to the same plasticizing agent group as that the plasticizing agent contained in the dielectric paste for forming the ceramic green sheet belongs to.

The content of the plasticizing agent is preferably about 0 weight % to about 200 weight % with respect to 100 weight parts of the binder, more preferably about 20 weight parts to about 200 weight parts, and most preferably about 50 weight parts to about 100 weight parts.

In the present invention, the agglutinant agent solution preferably contains an antistatic agent in an amount of 0.01 weight % to 15 weight % of the binder and more preferably contains an antistatic agent in an amount of 0.01 weight % to 10 weight % of the binder.

In the present invention, the antistatic agent contained in the agglutinant agent solution is not particularly limited insofar as it is an organic solvent having a hygroscopic property and illustrative examples of the antistatic agent contained in the agglutinant agent solution include ethylene glycol, polyethylene glycol, 2-3 butanediol, glycerin, an ampholytic surfactant such as an imidazoline system surfactant, a polyalkylene glycol derivative system surfactant and a carboxylic acid amidine salt system surfactant, and the like.

Among these, an ampholytic surfactant such as an imidazoline system surfactant, a polyalkylene glycol derivative system surfactant and a carboxylic acid amidine salt system surfactant is preferable since a small amount thereof can prevent static charge from being generated and enable peel-off of the third support sheet from the agglutinant layer with a small releasing force and an imidazoline system surfactant is particularly preferable since it enables peel-off of the third support sheet from the agglutinant layer with a very small releasing force.

In the present invention, in the case where the adhesive layer was transferred onto the surfaces of the electrode layer and the spacer layer, the agglutinant layer is formed on the base substrate so that the bonding strength between the agglutinant layer and the base substrate is higher than the bonding strength between the second support sheet and the release layer of the multi-layered unit and lower than the bonding strength between the agglutinant layer and the ceramic green sheet of the multi-layered unit.

In this case, the release layer is preferably formed on the surface of the second support sheet so that the bonding strength between the second support sheet and the release layer of the multi-layered unit is 5 to 20 mN/cm and the agglutinant layer is preferably formed on the surface of the base substrate so that the bonding strength between the agglutinant layer and the base substrate is 20 to 350 mN/cm and that the bonding strength between the agglutinant layer and the ceramic green sheet of the multi-layered unit is equal to or higher than 350 mN/cm.

In the present invention, the agglutinant layer is preferably formed on the base substrate so as to have a thickness of 0.01 µm to 0.3 µm. In the case where the thickness of the agglutinant layer is thinner than 0.01 µm, the bonding strength between the base substrate and the ceramic green sheet of the multi-layered unit becomes too low and it becomes difficult to laminate multi-layered units. On the other hand, in the case where the thickness of the agglutinant layer exceeds 0.3 µm, when a ceramic green chip fabricated by laminating the multi-layered units is baked, empty spaces are produced in the agglutinant layer and electrostatic capacitance of a multi-layered ceramic electronic component becomes lower.

The agglutinant layer is dried at a temperature between room temperature (25° C.) and about 80° C. for about 1 to about 5 minutes, for example. The drying conditions of the agglutinant layer are not particularly limited.

When multi-layered units are to be laminated, the surface of the ceramic green sheet of the multi-layered unit is brought into contact with the surface of the agglutinant layer formed on the surface of the base substrate to form a laminated body and the laminated body is pressed, whereby the multi-layered unit is bonded onto the surface of the agglutinant layer.

When the multi-layered unit has been bonded onto the surface of the agglutinant layer and laminated thereon, the second support sheet is peeled off from the release layer of the multi-layered unit.

Here, since the agglutinant layer is formed on the base substrate so that the bonding strength between the agglutinant layer and the base substrate is higher than the bonding strength between the second support sheet and the release layer of the multi-layered unit and lower than the bonding strength between the agglutinant layer and the ceramic green sheet of the multi-layered unit, only the second support sheet can be easily peeled off from the release layer.

When the second support sheet has been peeled off from the multi-layered unit laminated on the base substrate, a new multi-layered unit is further laminated on the multi-layered unit laminated on the base substrate.

When a new multi-layered unit is to be further laminated on the multi-layered unit laminated on the base substrate, similarly to the case where the adhesive layer formed on the third support sheet is transferred onto the surfaces of the electrode layer and the spacer layer or the surface of the ceramic green sheet, an adhesive layer is first formed on the third support sheet and the adhesive layer is transferred onto the surface of the ceramic green sheet of the new multi-layered unit to be laminated.

Then, the multi-layered unit is positioned so that the surface of the adhesive layer transferred onto the surface of the ceramic green sheet comes into contact with the surface of the release layer of the multi-layered unit laminated on the agglutinant layer of the base substrate to form a laminated body and the laminated body is pressed, whereby the new multi-layered unit is laminated on the multi-layered unit laminated on the agglutinant layer of the base substrate.

The second support sheet of the newly laminated multi-layered unit is then peeled off from the release layer.

Similarly to the above, a predetermined number of the multi-layered units are laminated on the agglutinant layer of the base substrate, thereby fabricating a multi-layered block.

Thus, when a predetermined number of multi-layered blocks to be included in a multi-layered ceramic electronic component have been fabricated, the multi-layered blocks are laminated on a substrate such as the outer layer of a multi-layered ceramic capacitor.

The multi-layered block laminated on the base substrate is positioned so that the surface of the release layer of the multi-layered unit last laminated on the multi-layered block comes into contact with the adhesive layer formed on the outer layer of a multi-layered ceramic capacitor or the like to form a laminated body and the laminated body is pressed, thereby laminating the multi-layered block on the substrate such as the outer layer of a multi-layered ceramic capacitor.

When the multi-layered block has been laminated on the substrate such as the outer layer of a multi-layered ceramic capacitor, the base substrate is peeled off from the multi-layered block.

Here, since the agglutinant layer is formed on the base substrate so that the bonding strength between the agglutinant layer and the base substrate is higher than the bonding strength between the second support sheet and the release layer of the multi-layered unit and lower than the bonding strength between the agglutinant layer and the ceramic green sheet of the multi-layered unit, the base substrate can alone be easily peeled off from the multi-layered block.

When the base substrate has been peeled off from the multi-layered block laminated on the substrate such as an outer layer of a multi-layered ceramic capacitor, a new multi-layered block laminated on the base substrate is further laminated on the multi-layered block laminated on the substrate such as the outer layer of a multi-layered ceramic capacitor.

Here, when the base substrate was peeled off from the multi-layered block, since only the base substrate was peeled off and the agglutinant layer was left on the multi-layered block, when a new multi-layered block laminated on the base substrate is to be further laminated on the multi-layered block laminated on the substrate such as the outer layer of a multi-layered ceramic capacitor, it is unnecessary to form an adhesive layer and it is therefore possible to efficiently laminate the multi-layered blocks.

When a new multi-layered block is to be laminated, the new multi-layered block laminated on the base substrate is positioned so that the surface of the release layer of the multi-layered unit last laminated on the multi-layered block comes into contact with the agglutinant layer of the multi-layered block laminated on the outer layer of a multi-layered ceramic capacitor or the like to form a laminated body and the laminated body is pressed, thereby laminating the new multi-layered block on the multi-layered block laminated on the substrate such as the outer layer of a multi-layered ceramic capacitor.

Similarly to the above, multi-layered blocks are laminated and a predetermined number of the multi-layered blocks to be included in the multi-layered ceramic electronic component are laminated.

To the contrary, in the present invention, in the case where the adhesive layer was transferred onto the surface of the ceramic green sheet, the agglutinant layer is formed on the base substrate so that the bonding strength between the agglutinant layer and the base substrate is higher than the bonding strength between the first support sheet and the ceramic green sheet of the multi-layered unit and lower than the bonding strength between the agglutinant layer and the release layer of the multi-layered unit.

In this case, the ceramic green sheet is preferably formed on the surface of the first support sheet so that the bonding strength between the first support sheet and the ceramic green sheet of the multi-layered unit is 5 to 20 mN/cm and the agglutinant layer is preferably formed on the surface of the base substrate so that the bonding strength between the agglutinant layer and the base substrate is 20 to 350 mN/cm and that the bonding strength between the agglutinant layer and the release layer of the multi-layered unit is equal to or higher than 350 mN/cm.

In the present invention, the agglutinant layer is preferably formed on the base substrate so as to have a thickness of 0.01 µm to 0.3 µm. In the case where the thickness of the agglutinant layer is thinner than 0.01 µm, the bonding strength between the base substrate and the release layer of the multi-layered unit becomes too low and it becomes difficult to laminate multi-layered units. On the other hand, in the case where the thickness of the agglutinant layer exceeds 0.3 µm, when a ceramic green chip fabricated by laminating the multi-layered units is baked, empty spaces are produced in the agglutinant layer and electrostatic capacitance of a multi-layered ceramic electronic component becomes lower.

The agglutinant layer is dried at a temperature between room temperature (25° C.) and about 80° C. for about 1 to about 5 minutes, for example. The drying conditions of the agglutinant layer are not particularly limited.

When multi-layered units are to be laminated, the surface of the release layer of the multi-layered unit is brought into contact with the surface of the agglutinant layer formed on the surface of the base substrate to form a laminated body and the laminated body is pressed, whereby the multi-layered unit is bonded onto the surface of the agglutinant layer.

When the multi-layered unit has been bonded onto the surface of the agglutinant layer and laminated thereon, the first support sheet is peeled off from the ceramic green sheet of the multi-layered unit.

Here, since the agglutinant layer is formed on the base substrate so that the bonding strength between the agglutinant layer and the base substrate is higher than the bonding strength between the first support sheet and the ceramic green sheet of the multi-layered unit and lower than the bonding strength between the agglutinant layer and the release layer of the multi-layered unit, the first support sheet can alone be easily peeled off from the ceramic green sheet.

When the first support sheet has been peeled off from the multi-layered unit laminated on the base substrate, a new multi-layered unit is further laminated on the multi-layered unit laminated on the base substrate.

When a new multi-layered unit is to be further laminated on the multi-layered unit laminated on the base substrate, similarly to the case where the adhesive layer formed on the third support sheet is transferred onto the surface of the electrode layer, an adhesive layer is first formed on the third support sheet and the adhesive layer is transferred onto the surface of the release layer of the new multi-layered unit to be laminated.

Then, the multi-layered unit is positioned so that the surface of the adhesive layer transferred onto the surface of the release layer comes into contact with the surface of the ceramic green sheet of the multi-layered unit laminated on the agglutinant layer of the base substrate to form a laminated body and the laminated body is pressed, whereby the new multi-layered unit is laminated on the multi-layered unit laminated on the agglutinant layer of the base substrate.

The first support sheet of the newly laminated multi-layered unit is then peeled off from the ceramic green sheet.

Similarly to the above, a predetermined number of the multi-layered units are laminated on the agglutinant layer of the base substrate, thereby fabricating a multi-layered block.

When a predetermined number of multi-layered blocks to be included in a multi-layered ceramic electronic component have been fabricated, the multi-layered blocks are laminated on a substrate such as an outer layer of a multi-layered ceramic capacitor.

The multi-layered block laminated on the base substrate is positioned so that the surface of the ceramic green sheet of the multi-layered unit last laminated on the multi-layered block comes into contact with the adhesive layer formed on the outer layer of a multi-layered ceramic capacitor or the like to form a laminated body and the laminated body is pressed, thereby laminating the multi-layered block on the substrate such as an outer layer of a multi-layered ceramic capacitor.

When the multi-layered block has been laminated on the substrate such as an outer layer of a multi-layered ceramic capacitor, the base substrate is peeled off from the multi-layered block.

Here, since the agglutinant layer is formed on the base substrate so that the bonding strength between the agglutinant layer and the base substrate is higher than the bonding strength between the first support sheet and the ceramic green sheet of the multi-layered unit and lower than the bonding strength between the agglutinant layer and the release layer of the multi-layered unit, only the base substrate can be easily peeled off from the multi-layered block.

When the base substrate has been peeled off from the multi-layered block laminated on the substrate such as an outer layer of a multi-layered ceramic capacitor, a new multi-layered block laminated on the base substrate is further laminated on the multi-layered block laminated on the substrate such as the outer layer of a multi-layered ceramic capacitor.

Here, when the base substrate was peeled off from the multi-layered block, since only the base substrate was peeled off and the agglutinant layer was left on the multi-layered block, when a new multi-layered block laminated on the base substrate is to be further laminated on the multi-layered block laminated on the substrate such as the outer layer of a multi-layered ceramic capacitor, it is unnecessary to form an adhesive layer and it is therefore possible to efficiently laminate the multi-layered blocks.

When a new multi-layered block is to be laminated, the new multi-layered block laminated on the base substrate is positioned so that the surface of the ceramic green sheet of the multi-layered unit last laminated on the multi-layered block comes into contact with the agglutinant layer of the multi-layered block laminated on the outer layer of a multi-layered ceramic capacitor or the like to form a laminated body and the laminated body is pressed, thereby laminating the new multi-layered block on the multi-layered block laminated on the substrate such as an outer layer of a multi-layered ceramic capacitor.

Similarly to the above, multi-layered blocks are laminated and a predetermined number of the multi-layered blocks to be included in the multi-layered ceramic electronic component are laminated.

The above and other objects and features of the present invention will become apparent from the following description made with reference to the accompanying drawings.

DESCRIPTION OF THE PREFERRED EMBODIMENTS

A method for manufacturing a multi-layered ceramic capacitor which is a preferred embodiment of the present invention will now be described with reference to accompanying drawings.

When a multi-layered ceramic capacitor is to be manufactured, a dielectric paste is first prepared in order to fabricate a ceramic green sheet.

The dielectric paste is normally prepared by kneading a dielectric raw material and an organic vehicle obtained by dissolving a binder into an organic solvent.

The resultant dielectric paste is applied onto a first support sheet using an extrusion coater or wire bar coater, thereby forming a coating layer.

As the first support sheet, a polyethylene terephthalate sheet is employed, for example, and the surface of the first support sheet is coated with a silicon resin, an alkyd resin or the like in order to improve the releasability thereof. The thickness of the first support sheet is not particularly limited but it is preferable for the first support sheet to have a thickness of about 5 µm to about 100 µm.

The first support sheet 1 preferably has such surface roughness as to include per 0.01 mm$^2$ thereof not more than one protrusion that can penetrate the ceramic green sheet 2 to be formed on the surface thereof to half or more the thickness of the ceramic green sheet 2 and include per 100 mm$^2$ thereof not more than one protrusion that can completely penetrate the ceramic green sheet 2.

The thus formed coating layer is dried at a temperature of about 50° C. to about 100° C. for about 1 to about 20 minutes, whereby a ceramic green sheet is formed on the first support sheet.

The thickness of the ceramic green sheet after drying is preferably equal to or thinner than 3 µm and more preferably equal to or thinner than 1.5 µm.

When the multi-layered unit is to be manufactured, since it is necessary to wind the first support sheet 1 around a roller, the first support sheet 1 is normally added with fillers in order to produce a predetermined friction force between itself and the roller when it is taken out from or wound around the roller and, therefore, the surface of the first support sheet 1 is formed with protrusions. However, in this embodiment, the first support sheet 1 has such surface roughness as to include per 0.01 mm$^2$ thereof not more than one protrusion that can penetrate the ceramic green sheet 2 to be formed on the surface thereof to half or more the thickness of the ceramic green sheet 2 and include per 100 mm$^2$ thereof not more than one protrusion that can completely penetrate the ceramic green sheet 2. Therefore, even in the case of forming a ceramic green sheet 2 having an extremely small thickness on the first support sheet 1, it is possible to effectively prevent the ceramic green sheet 2 from being damaged by the protrusions formed on the surface of the first support sheet 1.

Figure 1:
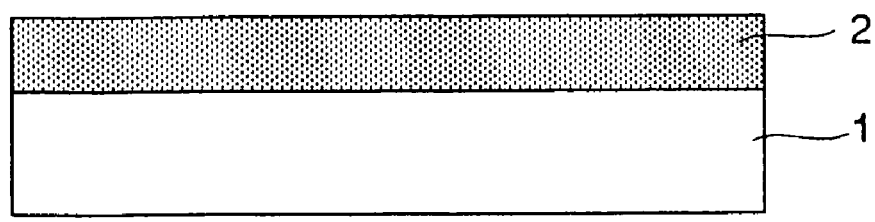
FIG. 1 is a schematic partial cross-sectional view showing how a ceramic green sheet is formed on a first support sheet.

FIG. 1 is a schematic partial cross-sectional view showing how the ceramic green sheet is formed on the first support sheet.

Actually, the first support sheet 1 is long and the ceramic green sheet 2 is continuously formed on the long first support sheet 1.

On other hand, a second support sheet is prepared independently of the first support sheet 1 and a release layer and an electrode layer are formed on the second support sheet.

Figure 2:
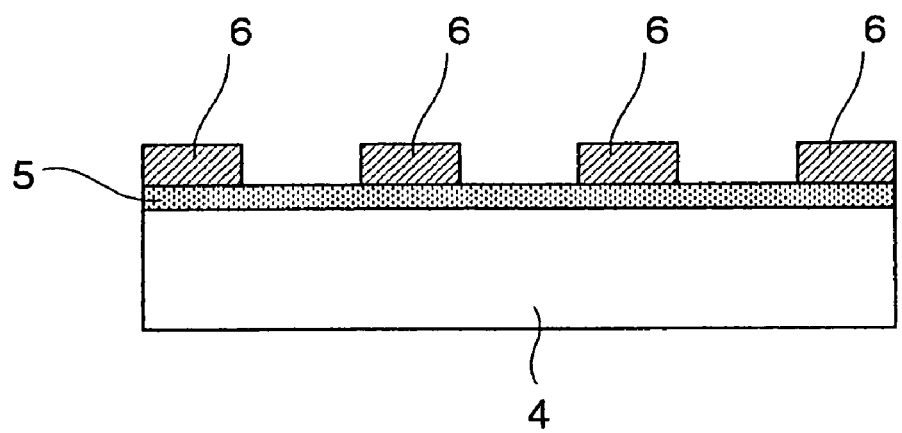
FIG. 2 is a schematic partial cross-sectional view showing a second support sheet formed with a release layer and an electrode layer on the surface thereof.

FIG. 2 is a schematic partial cross-sectional view showing a second support sheet 4 formed with a release layer 5 and an electrode layer 6 on the surface thereof.

Actually, the second support sheet 4 is long and the release layer 5 is continuously formed on the surface of the second support sheet 4 and the electrode layer 6 is formed on the surface of the release layer 5 in a predetermined pattern.

When the release layer 5 is to be formed on surface of the second support sheet 4, a dielectric paste for forming the release layer 5 is prepared in a similar manner to that for forming the ceramic green sheet 2.

A dielectric paste for forming the release layer 5 preferably contains dielectric particles having the same composition as that of dielectric particles contained in the ceramic green sheet 2.

The binder contained in the dielectric paste for forming the release layer 5 may or may not belong to the same binder group as that the binder contained in the ceramic green sheet 2 belongs to but it preferably belongs to the same binder group as that the binder contained in the ceramic green sheet 2 belongs to.

When the dielectric paste has been prepared in this manner, the surface of the second support sheet 4 is coated with the dielectric paste using a wire bar coater (not shown), thereby forming the release layer 5.

The thickness of the release layer 5 is preferably equal to or thinner than that of an electrode layer 6 to be formed thereon, more preferably equal to or thinner than about 60% of the electrode layer thickness and most preferably equal to or thinner than about 30% of the electrode layer thickness.

As the second support sheet 4, a polyethylene terephthalate sheet is employed, for example, and the surface of the second support sheet is coated with a silicon resin, an alkyd resin or the like in order to improve the releasability thereof. The thickness of the second support sheet 4 is not particularly limited and may be the same as or different from that of the first support sheet 1 on which the ceramic green sheet 2 is formed but it is preferable for the second support sheet 4 to have a thickness of about 5 µm to about 100 µm.

The second support sheet 4 preferably has such surface roughness as to include per 0.01 mm$^2$ thereof not more than one protrusion that can penetrate the ceramic green sheet 2 to half or more the thickness of the ceramic green sheet when the electrode layer 6 and the ceramic green sheet 2 are bonded to each other via an adhesive layer described later and include per 100 mm$^2$ thereof not more than one protrusion that can completely penetrate the ceramic green sheet 2 when the electrode layer 6 and the ceramic green 2 sheet are bonded to each other via the adhesive layer.

After the release layer 5 has been formed, the release layer 5 is dried at a temperature of about 50° C. to about 100° C. for about 1 to about 10 minutes.

In this embodiment, the release layer 5 is formed on the surface of the second support sheet 4 so that the bonding strength between the second support sheet 4 and the release layer 5 is 5 to 20 mN/cm.

After the release layer 5 has been dried, an electrode layer 6 which will form an inner electrode layer after baking is formed on the surface of the release layer 5 in a predetermined pattern.

It is preferable to form the electrode layer 6 so as to have a thickness of about 0.1 μm to about 5 μm and it is more preferable to form the electrode layer so as to have a thickness of about 0.1 μm to about 1.5 μm.

When the electrode layer 6 is to be formed on the release layer 5, an electrode paste is first prepared by kneading a conductive material containing any of various conductive metals or alloys, any of various oxides which will form a conductive material containing any of various conductive metals or alloys after baking, an organic metal compound, resinate or the like, and an organic vehicle prepared by dissolving a binder in an organic solvent.

As the conductive material used for preparing the electrode paste, Ni, Ni alloy or a mixture thereof is preferably used.

The average particle diameter of the conductive material is not particularly limited but a conductive material having an average particle diameter of about 0.1 μm to about 2 μm is normally used for preparing the electrode paste and a conductive material having an average particle diameter of about 0.2 μm to about 1 μm is preferably used for preparing the electrode paste.

The electrode layer 6 is formed by printing the surface of the release layer formed on the second support sheet with the electrode paste on using a screen printing machine or a gravure printing machine.

After forming the electrode layer 6 having the predetermined pattern on the surface of the release layer 5 using a screen printing process or a gravure printing process, a spacer layer is formed on the surface of the release layer 5 where no electrode layer 6 is formed in a complementary pattern to that of the electrode layer 6.

Figure 3:
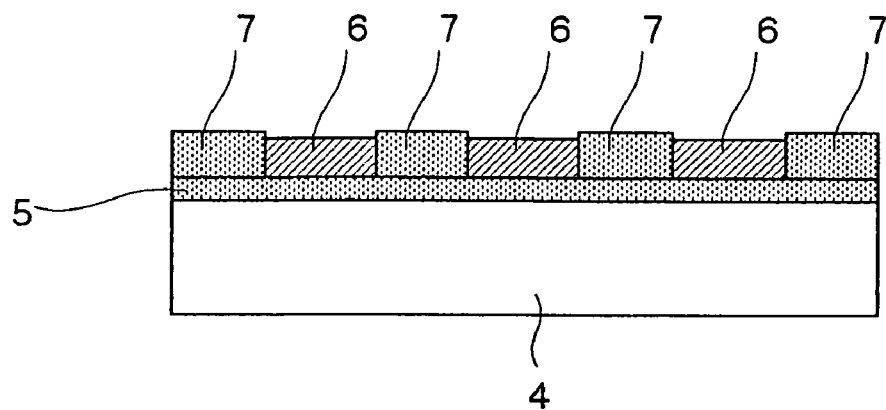
FIG. 3 is a schematic partial cross-sectional view showing how an electrode layer and a spacer layer are formed on the surface of a release layer.

FIG. 3 is a schematic partial cross-sectional view showing how the electrode layer 6 and the spacer layer 7 are formed on the surface of the release layer 5.

The spacer layer 7 can be formed on regions of the release layer 5 other than regions where the electrode layer 6 will be formed prior to forming the electrode layer 6 on the surface of the release layer 5.

When the spacer layer 7 is to be formed, a dielectric paste having a similar composition to that of the dielectric paste used for forming the ceramic green sheet is prepared and a screen printing process or a gravure printing process is used to print the dielectric paste on the surface of the release layer 5 where no electrode layer 6 is formed in a complementary pattern to that of the electrode layer 6.

In this embodiment, the spacer layer 7 is formed on the release layer 5 so that $t_s/t_e$ is equal to 1.1, where $t_s$ is the thickness of the spacer layer 7 and $t_e$ is the thickness of the electrode layer 6.

In this embodiment, the ceramic green sheet 2, and the electrode layer 6 and the spacer layer 7 are bonded via an adhesive layer and a third support sheet is further prepared independently of the first support sheet 1 on which the ceramic green sheet 2 is formed and the second support sheet 4 on which the electrode layer 6 and the spacer layer 7 are formed and an adhesive layer is formed on the third support sheet, thereby fabricating an adhesive layer sheet.

Figure 4:
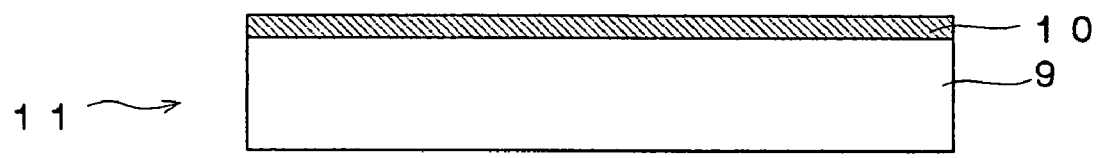
FIG. 4 is a schematic partial cross-sectional view showing an adhesive layer sheet obtained by forming an adhesive layer on the surface of a third support sheet.

FIG. 4 is a schematic partial cross-sectional view showing the adhesive layer sheet 11 in which an adhesive layer 10 is formed on the surface of a third support sheet 9.

Actually, the third support sheet 9 is long and the adhesive layer 10 is continuously formed on the long third support sheet 9.

As the third support sheet 9, a polyethylene terephthalate sheet is employed, for example, and the surface of the third support sheet 9 is coated with a silicon resin, an alkyd resin or the like in order to improve the releasability thereof. The thickness of the third support sheet 9 is not particularly limited but it is preferable for the third support sheet 9 to have a thickness of about 5 μm to about 100 μm.

When the adhesive layer 10 is to be formed, an adhesive agent solution is first prepared.

In this embodiment, the adhesive agent solution contains a binder, and, optionally, a plasticizing agent, a release agent and an antistatic agent.

The adhesive agent solution may contain dielectric particles having the same composition as that of dielectric particles contained in the ceramic green sheet. In the case where the adhesive agent solution contains dielectric particles, it is preferable for the ratio of the weight of the dielectric particles to the weight of the binder to be less than the ratio of the weight of the dielectric particles contained in the ceramic green sheet to the weight of the binder.

The binder contained in the adhesive agent solution preferably belongs to the same binder group as that the binder contained in the ceramic green sheet belongs to but it is not absolutely necessary for it to belong to the same binder group as that the binder contained in the ceramic green sheet belongs to.

The plasticizing agent contained in the adhesive agent solution preferably belongs to the same plasticizing agent group as that the plasticizing agent contained in the dielectric paste for forming the ceramic green sheet belongs to but it is not absolutely necessary for it to belong to the same plasticizing agent group as that the plasticizing agent contained in the dielectric paste for forming the ceramic green sheet belongs to.

The content of the plasticizing agent is preferably about 0 weight % to about 200 weight % with respect to 100 weight parts of the binder, more preferably about 20 weight parts to about 200 weight parts, and most preferably about 50 weight parts to about 100 weight parts.

In this embodiment, the adhesive agent solution contains an antistatic agent in an amount of 0.01 weight % to 15 weight % of the binder.

In this embodiment, as the antistatic agent, an imidazoline system surfactant is employed.

The thus prepared adhesive agent solution is applied onto the third support sheet 9 using a bar coater, an extrusion coater, a reverse coater, a dip coater, a kiss coater or the like, thereby forming the adhesive layer 10 so as to preferably have a thickness of about 0.02 μm to about 0.3 μm, more preferably have a thickness of about 0.02 μm to about 0.1 μm. In the case where the thickness of the adhesive layer 10 is thinner than about 0.02 μm, the adhesion force is lowered and, on the other hand, in the case where the thickness of the adhesive layer 10 exceeds about 0.3 μm, defects (empty spaces) tend to be generated.

The adhesive layer 10 is dried at a temperature between room temperature (25° C.) and about 80° C. for about 1 to about 5 minutes. The drying conditions of the adhesive layer 10 are not particularly limited.

Figure 5:
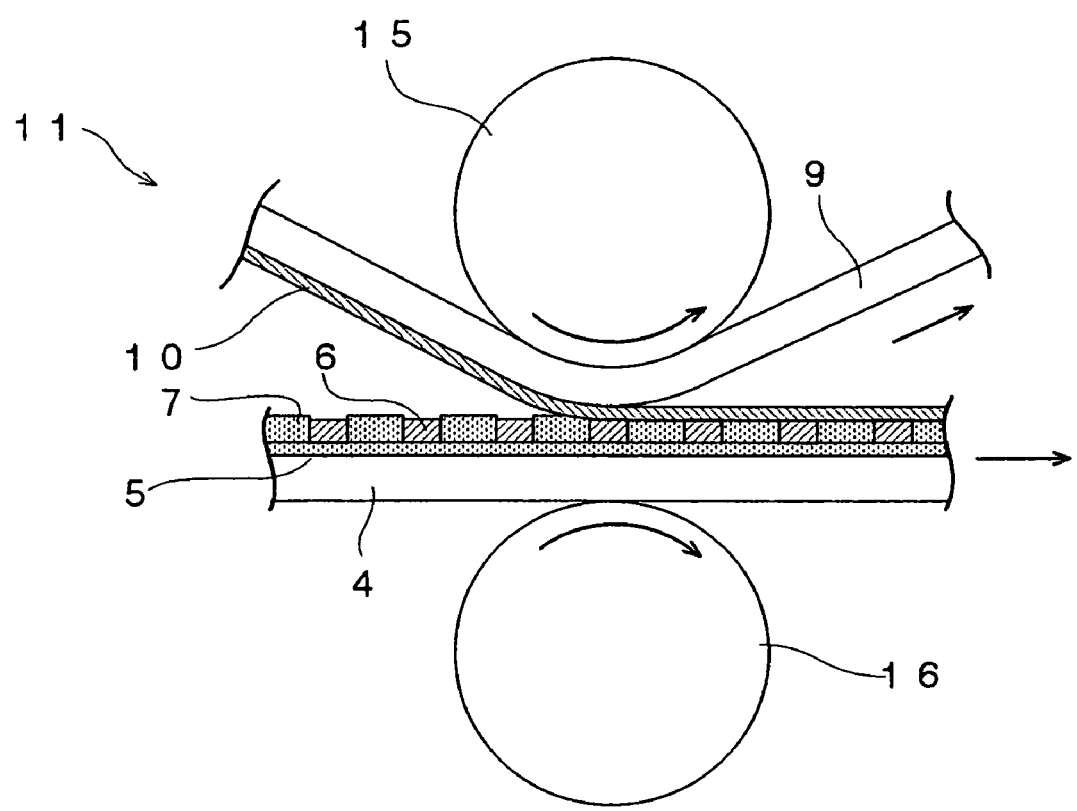
FIG. 5 is a schematic cross-sectional view showing a preferred embodiment of an adhering and peeling apparatus for bonding an adhesive layer formed on a third support sheet onto the surfaces of an electrode layer and a spacer layer formed on a second support sheet and peeling off the third support sheet from the adhesive layer.

FIG. 5 is a schematic cross-sectional view showing a preferred embodiment of an adhering and peeling apparatus for bonding the adhesive layer 10 formed on the third support sheet 9 onto the surfaces of the electrode layer 6 and the spacer layer 7 formed on the second support sheet 4 and peeling off the third support sheet 9 from the adhesive layer 10.

As shown in FIG. 5, the adhering and peeling apparatus according to this embodiment includes a pair of pressure rollers 15, 16 whose temperature is held at about 40° C. to about 100° C.

As shown in FIG. 5, the third support sheet 9 formed with the adhesive layer 10 is fed to a portion between the pair of pressure rollers 15, 16 from an obliquely upper location in such a manner that the third support sheet 9 is wound around part of the upper pressure roller 15 by a tensile force applied to the third support sheet 9. On the other hand, the second support sheet 4 formed with the electrode layer 6 and the spacer layer 7 is fed to a portion between the pair of pressure rollers 15, 16 in a substantially horizontal direction in such a manner that the second support sheet 4 comes into contact with the lower pressure roller 16 and the electrode layer 6 and the spacer layer 7 come into contact with the adhesive layer 10 formed on the third support sheet 9.

The feed rates of the second support sheet 4 and the third support sheet 9 are set to 2 m/sec, for example, and the nip pressure between the pair of pressure rollers 15, 16 is preferably set between about 0.2 MPa and about 15 MPa and more preferably between about 0.2 Mpa and about 6 Mpa.

As a result, the adhesive layer 10 formed on the third support sheet 9 is bonded to the surfaces of the electrode layer 6 and the spacer layer 7 formed on the second support sheet 4.

As shown in FIG. 5, the third support sheet 9 formed with the adhesive layer 10 is fed obliquely upward from the portion between the pair of pressure rollers 15, 16 and the third support sheet 9 is peeled off from the adhesive layer 10 bonded to the electrode layer 6 and the spacer layer 7.

When the third support sheet 9 is peeled off from the adhesive layer 10, if static charge should be generated so that dust attaches to the adhesive layer 10 and the adhesive layer 10 is attracted to third support sheet 9, it would become difficult to peel off the third support sheet 9 from the adhesive layer 10. However, in this embodiment, the adhesive layer 10 contains an imidazoline system surfactant in an amount of 0.01 weight % to 15 weight % of the binder, so that generation of static charge can be effectively prevented.

When the adhesive layer 10 has been bonded to the electrode layer 6 and the spacer layer 7 and the third support sheet 9 has been peeled off from the adhesive layer 10 in this manner, the electrode layer 6 and the spacer layer 7 are bonded onto the surface of the ceramic green sheet 2 formed on the first support sheet 1 via the adhesive layer 10.

Figure 6:
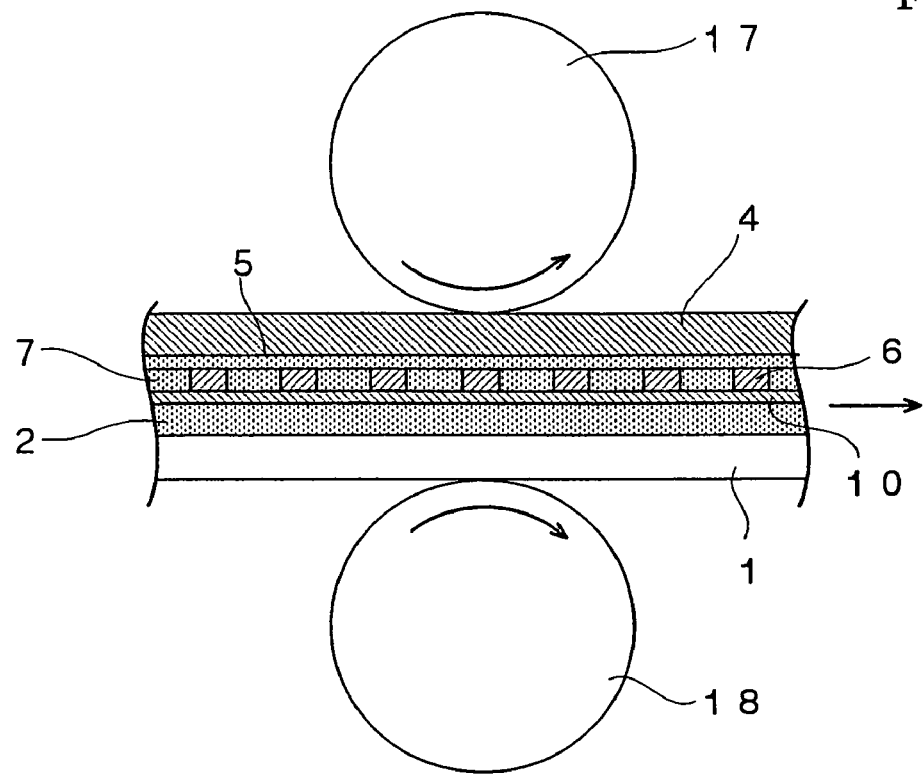
FIG. 6 is a schematic cross-sectional view showing a preferred embodiment of an adhering apparatus for bonding an electrode layer and a spacer layer onto the surface of a ceramic green sheet via an adhesive layer.

FIG. 6 is a schematic cross-sectional view showing a preferred embodiment of an adhering apparatus for bonding the electrode layer 6 and the spacer layer 7 onto the surface of the ceramic green sheet 2 via the adhesive layer 10.

As shown in FIG. 6, the adhering apparatus according to this embodiment includes a pair of pressure rollers 17, 18 whose temperature is held at about 40° C. to about 100° C. The second support sheet 4 formed with the electrode layer 6, the spacer layer 7 and the adhesive layer 10 is fed to a portion between the pair of pressure rollers 17, 18 in such a manner that the second support sheet 4 comes into contact with the upper pressure roller 17 and, on the other hand, the first support sheet 1 formed with the ceramic green sheet 2 is fed to the portion between the pair of pressure rollers 17, 18 in such a manner that the first support sheet 1 comes into contact with the lower pressure roller 18.

In this embodiment, the pressure roller 17 is constituted as a metal roller and the pressure roller 18 is constituted as a rubber roller.

The feed rates of the first support sheet 1 and the second support sheet 4 and are set to 2 m/sec, for example, and the nip pressure between the pair of pressure rollers 15, 16 is preferably set between about 0.2 MPa and about 15 MPa and more preferably between about 0.2 Mpa and about 6 Mpa.

In this embodiment, since the ceramic green sheet 2 and the electrode and spacer layers 6, 7 are bonded to each other via the adhesive layer 10 and, unlike in the conventional process, they are not bonded utilizing the agglutinant forces of binders contained in the ceramic green sheet 2, the electrode layer 6 and spacer layer 7 or the deformation of the ceramic green sheet 2, the electrode layer 6 and the spacer layer 7, it is possible to bond the ceramic green sheet 2 and the electrode and the spacer layers 6, 7 with a low pressure such as about 0.2 MPa to about 15 Mpa.

Therefore, since it is possible to prevent the ceramic green sheet 2, the electrode layer 6 and the spacer layer 7 from deforming, a multi-layered ceramic capacitor can be manufactured with high accuracy by laminating the thus formed laminated bodies including the ceramic green sheet 2, the electrode layer 6 and the spacer layer 7.

Further, in this embodiment, the electrode layer 6, and the spacer layer 7 whose density is lower than that of the electrode layer 6 and whose compression ratio is higher than that of the electrode layer 6, are formed so that $t_s/t_e$ is equal to 1.1, the spacer layer 7 is compressed by the pressure applied when the electrode layer 6 and the spacer layer 7 are transferred onto the ceramic green sheet 2 via the adhesive layer 10, so that the ceramic green sheet 2, and the electrode and spacer layers 6, 7 can be reliably bonded to each other via the adhesive layer 10. Therefore, it is possible to reliably prevent the electrode layer 6 from peeling off from the ceramic green sheet 2 together with the second support sheet 4 when the second support sheet 4 is peeled off.

Furthermore, in this embodiment, since the electrode layer 6 formed on the second support sheet 4 is bonded onto the surface of the ceramic green sheet 2 via the adhesive layer 10 after the electrode layer 6 has been dried, unlike in the case where the electrode layer 6 is formed by printing an electrode paste on the surface of the ceramic green sheet 2, the electrode paste neither dissolves nor swells the binder contained in the ceramic green sheet 2 and the electrode paste does not seep into the ceramic green sheet 2. It is therefore possible to form the electrode layer 6 on the surface of the ceramic green sheet 2.

Moreover, in this embodiment, the first support sheet 1 formed with the ceramic green sheet 2 on the surface thereof has such surface roughness as to include per 0.01 mm$^2$ thereof not more than one protrusion that can penetrate the ceramic green sheet 2 to be formed on the surface thereof to half or more the thickness of the ceramic green sheet 2 and include per 100 mm$^2$ thereof not more than one protrusion that can completely penetrate the ceramic green sheet 2. Therefore, even in the case of forming a ceramic green sheet 2 having an extremely small thickness on the first support sheet 1, it is possible to effectively prevent the ceramic green sheet 2 from being damaged by the protrusions formed on the surface of the first support sheet 1.

Further, when the multi-layered unit is to be manufactured, since it is necessary to wind the second support sheet 4 around a roller, the second support sheet 4 is normally added with fillers in order to produce a predetermined friction force between itself and the roller when it is taken out from or wound around the roller and therefore, the surface of the second support sheet 4 is formed with protrusions. However, in this embodiment, the support sheet selected as the second support sheet 4 has such surface roughness as to include per 0.01 mm² thereof not more than one protrusion that can penetrate the ceramic green sheet 2 to half or more the thickness of the ceramic green sheet when the ceramic green sheet 2 and the electrode and spacer layers 6, 7 are pressed onto each other via the adhesive layer and to include per 100 mm² thereof not more than one protrusion that can completely penetrate the ceramic green sheet 2 when the ceramic green sheet 2 and the electrode layer and spacer layers 6, 7 are pressed onto each other via the adhesive layer. Therefore, even in the case of forming a ceramic green sheet 2 having an extremely small thickness on the first support sheet 1, when the ceramic green sheet 2, and the electrode and spacer layers 6, 7 are pressed onto each other via the adhesive layer 10, thereby bonding the ceramic green sheet and the electrode and spacer layers 6, 7 onto each other, it is possible to effectively prevent the ceramic green sheet 2 from being damaged by the protrusions formed on the surface of the second support sheet 4.

When the ceramic green sheet 2 formed on the first support sheet 1 has been bonded onto the electrode layer 6 and the spacer layer 7 formed on the second support sheet 4 via the adhesive layer 10 in this manner, the first support sheet 1 is peeled off from the ceramic green sheet 2.

Thus, a laminated body in which the release layer 5, the electrode layer 6, the spacer layer 7, the adhesive layer 10 and the ceramic green sheet 2 are laminated on the second support sheet 4 is obtained.

The thus obtained laminated body is cut to a predetermined size, thereby fabricating a multi-layered unit having a predetermined size and including the release layer 5, the electrode layer 6, the spacer layer 7, the adhesive layer 10 and the ceramic green sheet 2 laminated on the second support sheet 4.

Figure 7:
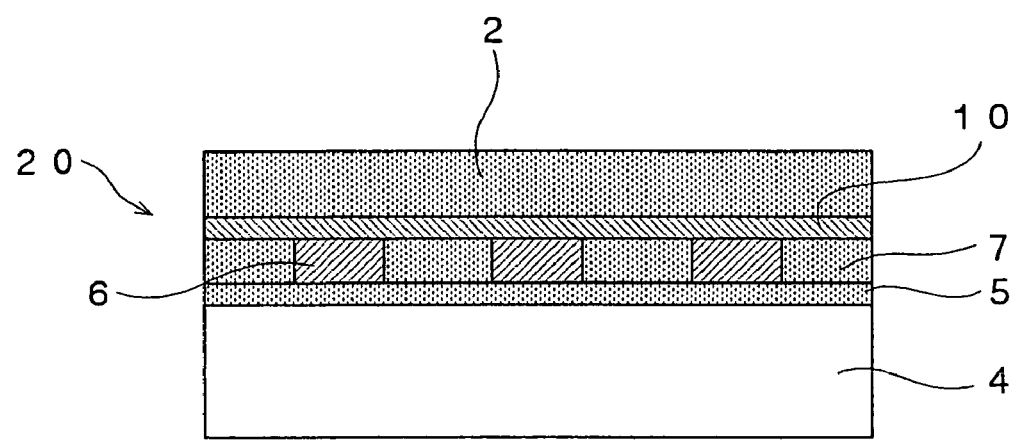
FIG. 7 is a schematic cross-sectional view showing a multi-layered unit obtained by laminating an electrode layer, a spacer layer, an adhesive layer and a ceramic green sheet on a second support sheet.

FIG. 7 is a schematic cross-sectional view showing multi-layered unit 20 cut to a predetermined size in this manner.

As shown in FIG. 7, the multi-layered unit 20 is formed on the second support sheet 4 and includes the release layer 5, the electrode layer 6, the spacer layer 7, the adhesive layer 10 and the ceramic green sheet 2.

Similarly to the above, release layers 5, electrode layers 6, spacer layers 7, adhesive layers 10 and ceramic green sheets 2 are laminated on the surfaces of other second support sheets 4 so as to fabricate a number of the multi-layered units 20 each including the release layer 5, the electrode layer 6, the spacer layer 7, the adhesive layer 10 and the ceramic green sheet 2.

A number of the thus fabricated multi-layered units 20 are laminated via the adhesive layer 10, thereby manufacturing a multi-layered ceramic capacitor.

Figure 8:
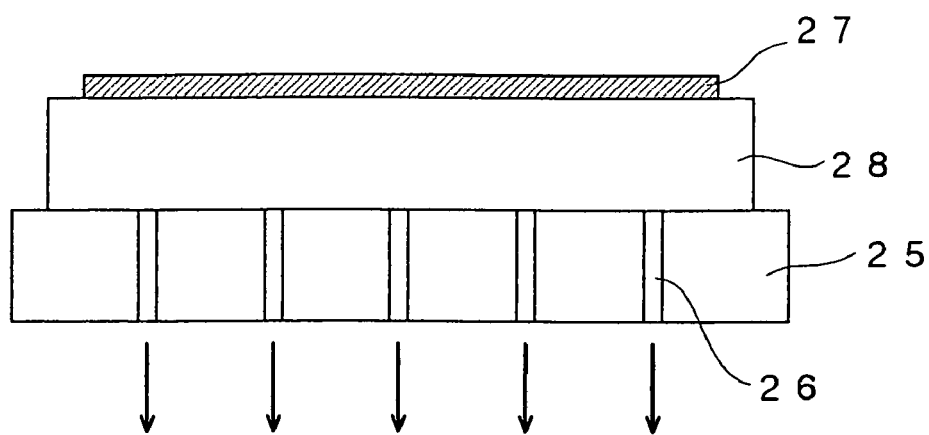
FIG. 8 is a schematic partial cross-sectional view showing a first step of a lamination process of multi-layered units.

FIG. 8 is a schematic partial cross-sectional view showing a first step of a lamination process of the multi-layered units 20.

As shown in FIG. 8, when a number of the multi-layered units 20 are to be laminated, a base substrate 28 formed with an agglutinant layer 27 on the surface thereof is first set on a substrate 25 formed with a number of holes 26.

As the base substrate 28, a polyethylene terephthalate film or the like is employed.

In this embodiment, the base substrate 28 has such surface roughness as to include per of 0.01 mm² thereof not more than one protrusion that can penetrate the ceramic green sheet 2 laminated on the agglutinant layer 27 to half or more the thickness of the ceramic green sheet 2, include per 100 mm² thereof not more than one protrusion that can completely penetrate the ceramic green sheet and include per 1 mm² thereof not more than one protrusion that can penetrate the ceramic green sheet 2 to a depth of 0.2 µm or greater.

Further, the agglutinant layer 27 is formed on the base substrate 28 so that the bonding strength between the agglutinant layer 27 and the base substrate 28 is higher than the bonding strength between the second support sheet 4 and the release layer 5 of the multi-layered unit 20 and lower than the bonding strength between the agglutinant layer 27 and the ceramic green sheet 2 of the multi-layered unit 20.

In this embodiment, the agglutinant layer 27 is formed on the base substrate 28 so that the bonding strength between the agglutinant layer 27 and the base substrate 28 is 20 to 350 mN/cm and that the bonding strength between the agglutinant layer 27 and the ceramic green sheet 2 of the multi-layered unit 20 is equal to or higher than 350 mN/cm.

The agglutinant layer 27 is formed by coating the base substrate 28 with an agglutinant agent solution.

In this embodiment, the agglutinant agent solution contains a binder and a plasticizing agent and, optionally, a release agent and an antistatic agent.

The agglutinant agent solution contains a binder belonging to the same binder group as that the binder contained in the dielectric paste for forming the ceramic green sheet 2 belongs to and contains a plasticizing agent belonging to the same plasticizing agent group as that the plasticizing agent contained in the dielectric paste for forming the ceramic green sheet 2 belongs to.

The agglutinant agent solution contains an imidazoline system surfactant in an amount of 0.01 weight % to 15 weight % of the binder.

In this embodiment, the agglutinant layer 27 has a thickness of 0.01 µm to 0.3 µm. In the case where the thickness of the agglutinant layer 27 is thinner than 0.01 µm, the bonding strength between the base substrate 28 and the ceramic green sheet 2 of the multi-layered unit 20 becomes too low and it becomes difficult to laminate multi-layered units 20. On the other hand, in the case where the thickness of the agglutinant layer 27 exceeds 0.3 µm, when a ceramic green chip fabricated by laminating the multi-layered units is baked, empty spaces are produced in the agglutinant layer 27 and electrostatic capacitance of a multi-layered ceramic electronic component becomes lower.

The base substrate 28 is sucked with air via the plurality of holes 26 formed in the substrate 25, thereby fixing it at a predetermined position on the substrate 25.

Figure 9:
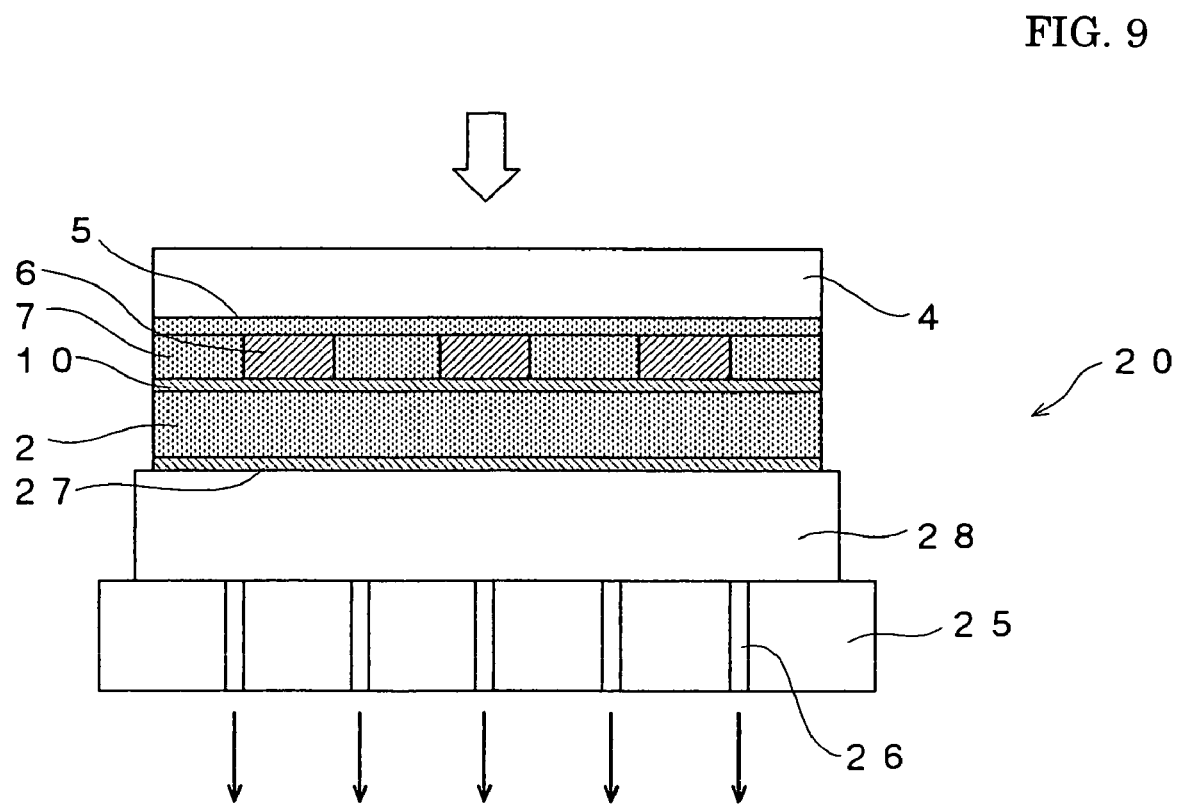
FIG. 9 is a schematic partial cross-sectional view showing a second step of a lamination process of multi-layered units.

FIG. 9 is a schematic partial cross-sectional view showing a second step of the lamination process of the multi-layered units 20.

As shown in FIG. 9, the multi-layered unit 20 is positioned so that the surface of the ceramic green sheet 2 comes into contact with the surface of the agglutinant layer 27 formed on the base substrate 28 and a pressure is applied onto the second support sheet 4 of the multi-layered units 20 using a pressing machine or the like.

As a result, the multi-layered unit 20 is bonded onto the base substrate 28 fixed on the substrate 25 via the agglutinant layer 27 to be laminated thereon.

In this embodiment, the base substrate 28 has such surface roughness as to include per 0.01 mm² thereof not more than one protrusion that can project into the ceramic green sheet 2 laminated on the agglutinant layer 27 to half or more the thickness of the ceramic green sheet 2 and include per 100 mm² thereof not more that one protrusion that can completely penetrate the ceramic green sheet. Therefore, even in the case where the ceramic green sheet 2 is made thin, when a pressure is applied onto the multi-layered unit 20, thereby laminating the multi-layered unit 20 on the base substrate 28, it is possible to effectively prevent the ceramic green sheet 2 from being damaged by the protrusions formed on the surface of the base substrate 28 and short-circuit failure from occurring in a multi-layered ceramic electronic component fabricated by laminating a number of multi-layered units 20 each including a ceramic green sheet 2 and an electrode layer 6.

Figure 10:
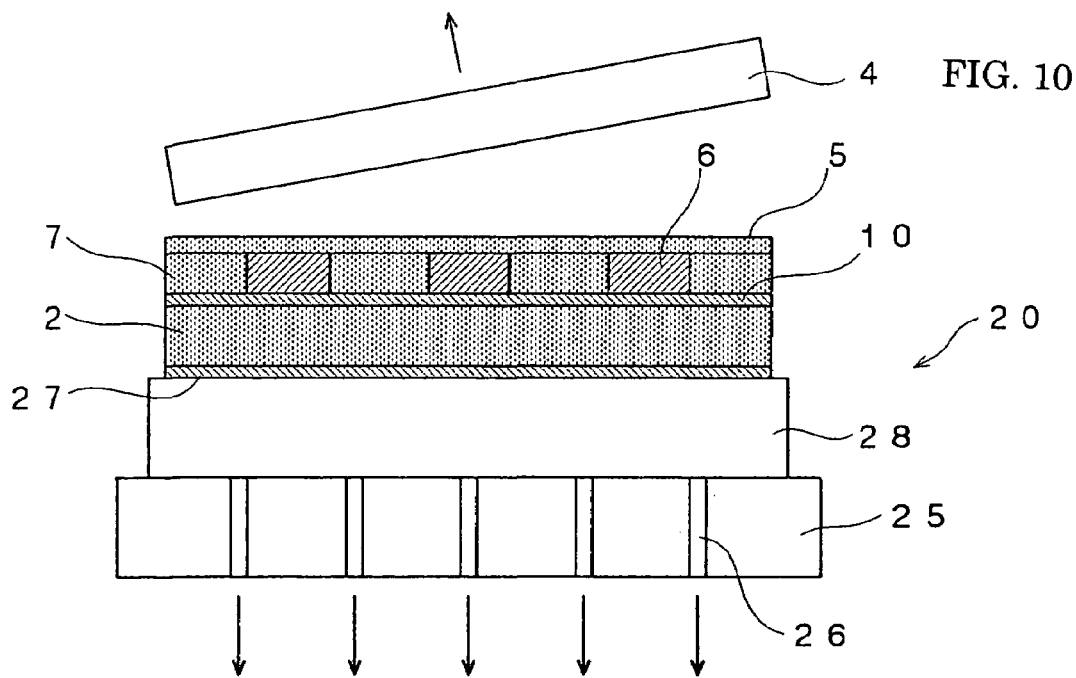
FIG. 10 is a schematic partial cross-sectional view showing a third step of a lamination process of multi-layered units.

FIG. 10 is a schematic partial cross-sectional view showing a third step of the lamination process of the multi-layered units 20.

When the multi-layered unit 20 has been bonded onto the base substrate 28 fixed on the substrate 25 via the agglutinant layer 27 to be laminated thereon, the second support sheet 4 is peeled off from the release layer 5 of the multi-layered units 20, as shown in FIG. 10.

In this embodiment, the release layer 5 is formed on the surface of the second support sheet 4 so that the bonding strength between the second support sheet 4 and the release layer 5 of the multi-layered unit 20 is 5 to 20 mN/cm and the agglutinant layer 27 is formed on the surface of the base substrate 28 so that the bonding strength between the agglutinant layer 27 and the base substrate 28 is 20 to 350 mN/cm and that the bonding strength between the agglutinant layer 27 and the ceramic green sheet 2 of the multi-layered unit 20 is equal to or higher than 350 mN/cm. Therefore, since the agglutinant layer 27 is formed on the surface of the base substrate 28 so that the bonding strength between the agglutinant layer 27 and the base substrate 28 is higher than the bonding strength between the second support sheet 4 and the release layer 5 of the multi-layered unit 20 and lower than the bonding strength between the agglutinant layer 27 and the ceramic green sheet 2 of the multi-layered unit 20, it is possible to easily peel off only the second support sheet 4 from the multi-layered unit 20 bonded onto the agglutinant layer 27.

Further, in this embodiment, since the electrode layer 6 and the spacer layer 7 are formed so that $t_s/t_e$ is equal to 1.1, the spacer layer 7 is compressed by the pair of pressure rollers 17, 18, not only the spacer layer 7 but also the electrode layer 6 are bonded onto the surface of the ceramic green sheet 2 via the adhesive layer 10 and it is therefore possible to effectively prevent the electrode layer 6 from being peeled off from the ceramic green sheet 2 together with the second support sheet 4 when the second support sheet 4 is peeled off.

When the second support sheet 4 has been peeled off from the release layer 5 of the multi-layered unit 20 in this manner, a new multi-layered unit 20 is further laminated on the release layer 5 of the multi-layered unit 20 laminated on the base substrate 28 fixed to the substrate 25 via the agglutinant layer 27.

Prior to newly laminating the multi-layered unit 20, the adhesive layer 10 formed on the third support sheet 9 is transferred onto the surface of the ceramic green sheet 2 of the multi-layered unit 20 to be newly laminated.

More specifically, similarly to the case where the adhesive layer 10 of the adhesive layer sheet 11 is transferred onto the surfaces of the electrode layer 6 and the spacer layer 7 formed on the second support sheet 4, the adhesive layer 10 of the adhesive layer sheet 11 is transferred onto the surface of the ceramic green sheet 2 of the multi-layered unit 20 to be newly laminated.

Figure 11:
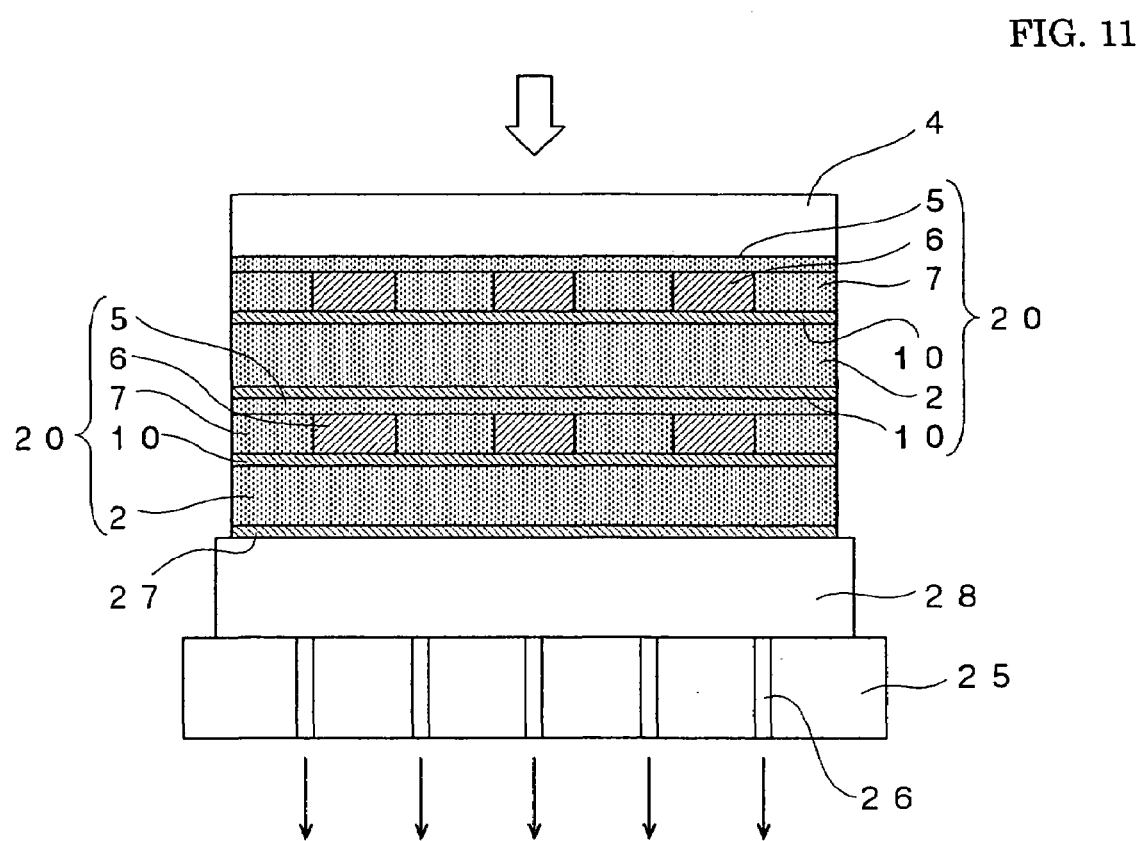
FIG. 11 is a schematic partial cross-sectional view showing a fourth step of a lamination process of multi-layered units.

FIG. 11 is a schematic partial cross-sectional view showing a fourth step of the lamination process of the multi-layered units 20.

As shown in FIG. 11, the new multi-layered unit 20 is positioned so that the surface of the adhesive layer 10 transferred onto the ceramic green sheet 2 comes into contact with the surface of the release layer 5 of the multi-layered unit 20 bonded onto the agglutinant layer 27 and pressure is applied to the new multi-layered unit 20 using a pressing machine or the like.

As a result, the new multi-layered unit 20 is laminated on the multi-layered unit 20 bonded onto the agglutinant layer 27 via the adhesive layer 10 transferred onto the ceramic green sheet 2.

Figure 12:
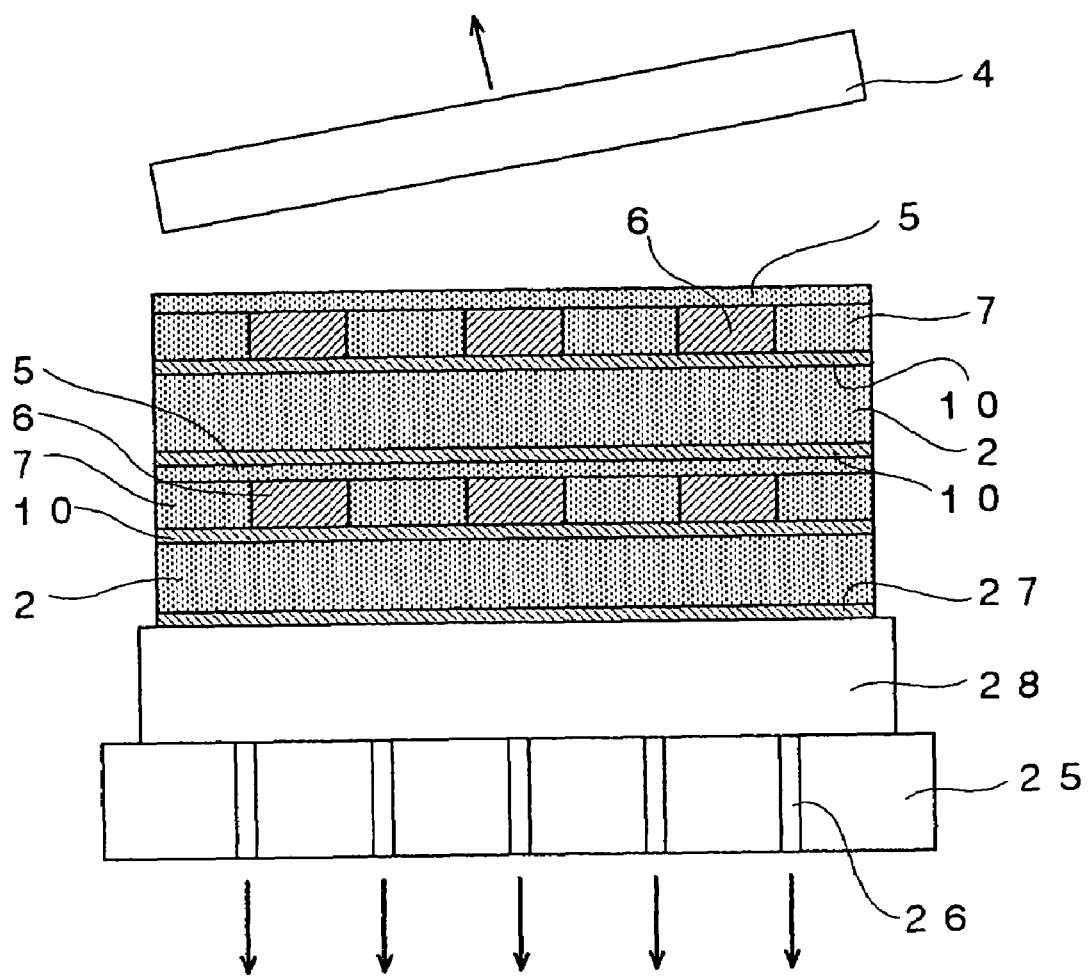
FIG. 12 is a schematic partial cross-sectional view showing a fifth step of a lamination process of multi-layered units.

FIG. 12 is a schematic partial cross-sectional view showing a fifth step of the lamination process of the multi-layered units 20.

When the new multi-layered unit 20 has been laminated on the multi-layered unit 20 bonded onto the agglutinant layer 27 via the adhesive layer 10 formed on the ceramic green sheet 2 the second support sheet 4 of the new multi-layered unit 20 is peeled off from the release layer 5 of the multi-layered unit 20, as shown in FIG. 12.

In this embodiment, the release layer 5 is formed on the surface of the second support sheet 4 so that the bonding strength between the second support sheet 4 and the release layer 5 of the multi-layered unit 20 is 5 to 20 mN/cm and the agglutinant layer 27 is formed on the surface of the base substrate 28 so that the bonding strength between the agglutinant layer 27 and the base substrate 28 is 20 to 350 mN/cm and that the bonding strength between the agglutinant layer 27 and the ceramic green sheet 2 of the multi-layered unit 20 is equal to or higher than 350 mN/cm. Therefore, since the agglutinant layer 27 is formed on the surface of the base substrate 28 so that the bonding strength between the agglutinant layer 27 and the base substrate 28 is higher than the bonding strength between the second support sheet 4 and the release layer 5 of the multi-layered unit 20 and lower than the bonding strength between the agglutinant layer 27 and the ceramic green sheet 2 of the multi-layered unit 20 and the newly laminated multi-layered unit 20 is bonded onto the multi-layered unit 20 bonded onto the agglutinant layer 27 by the adhesive layer 10, it is possible to easily peel off only the second support sheet 4 from the multi-layered unit 20 bonded onto the agglutinant layer 27.

Similarly to the above, multi-layered units 20 are sequentially laminated and a predetermined number of multi-layered units 20 are laminated on the base substrate 28 fixed to the substrate 25, thereby fabricating a multi-layered block.

When a predetermined number of the multi-layered units 20 have been laminated on the base substrate 28 fixed to the substrate 25, thereby fabricating the multi-layered block, the multi-layered block fabricated by laminating a predetermined number of the multi-layered units 20 on the base substrate 28 fixed to the substrate 25 is laminated on an outer layer of a multi-layered ceramic capacitor.

Figure 13:
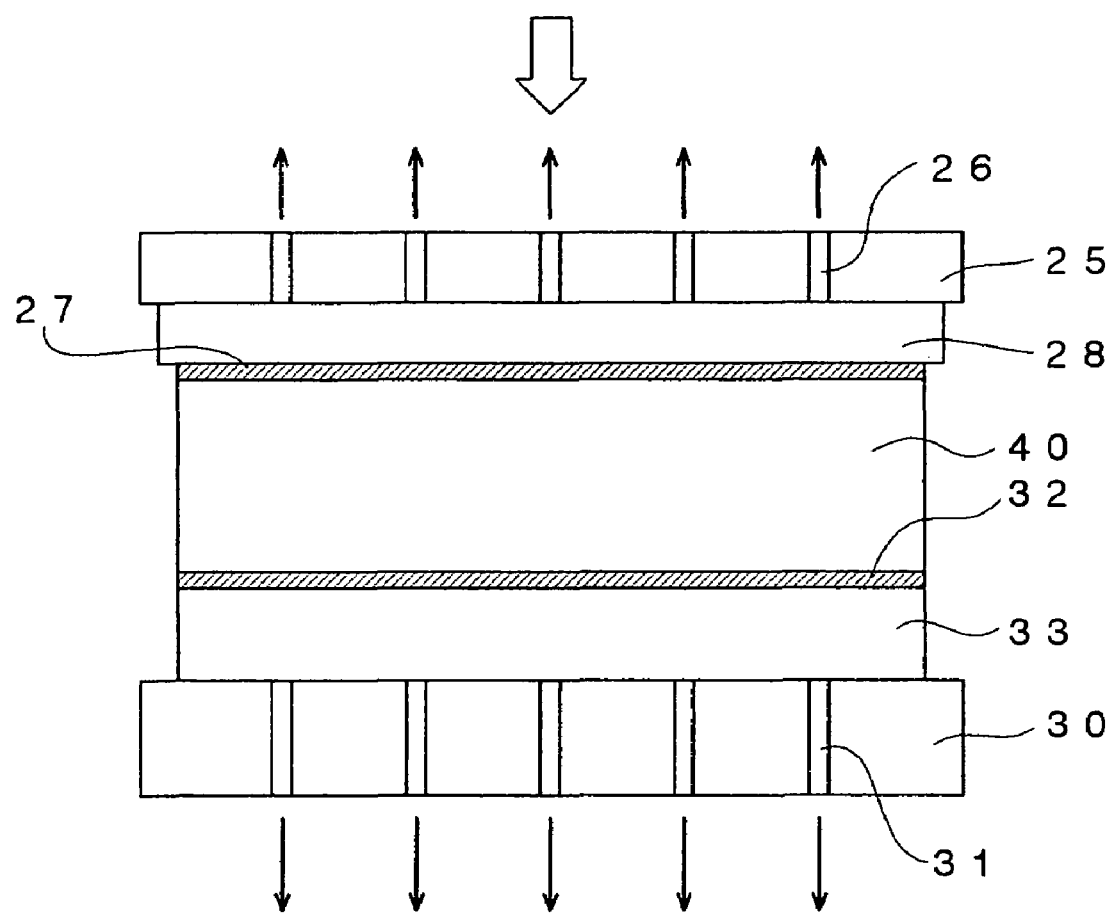
FIG. 13 is a schematic partial cross-sectional view showing a first step of a lamination process of for laminating a multi-layered block laminated on a base substrate fixed to a substrate on an outer layer of a multi-layered ceramic capacitor.

FIG. 13 is a schematic partial cross-sectional view showing a first step of a lamination process of for laminating the multi-layered block laminated on the base substrate 28 fixed to the substrate 25 on the outer layer of the multi-layered ceramic capacitor.

As shown in FIG. 13, an outer layer 33 formed with an adhesive layer 10 is set on a base 30 formed with a number of holes 31.

The outer layer 33 is sucked with air via the number of the holes 31 formed in the base 30 and fixed at a predetermined position on the base 30.

As shown in FIG. 13, the multi-layered block 40 laminated on the base substrate 28 sucked with air via a number of the holes 26 and fixed at a predetermined position on the substrate 25 is then positioned so that the surface of the release layer 5 of the last laminated multi-layered unit 20 comes into contact with the surface of an adhesive layer 32 formed on the outer layer 33.

Then, the suction operation with air via the number of the holes 26 is stopped and the substrate 25 is removed from the base substrate 28 supporting the multi-layered block 40.

When the substrate 25 has been removed from the base substrate 28, a pressure is applied onto the base substrate 28 using a pressing machine or the like.

As a result, the multi-layered block 40 is bonded onto the outer layer 33 fixed to the base 30 via the adhesive layer 32 and laminated thereon.

Figure 14:
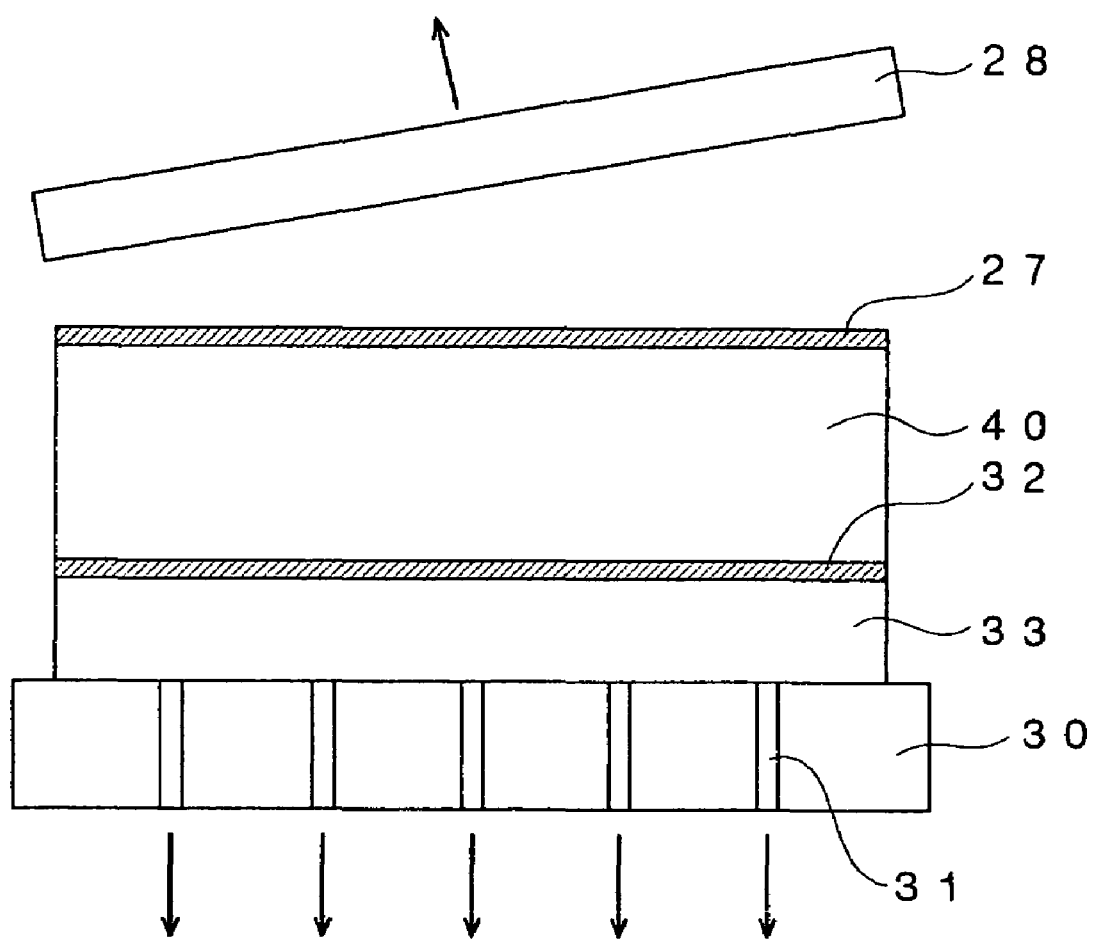
FIG. 14 is a schematic partial cross-sectional view showing a second step of a lamination process of for laminating a multi-layered block laminated on a base substrate fixed to a substrate on an outer layer of a multi-layered ceramic capacitor.

FIG. 14 is a schematic partial cross-sectional view showing a second step of a lamination process for laminating the multi-layered block 40 laminated on the base substrate 28 fixed to the substrate 25 on the outer layer 33 of the multi-layered ceramic capacitor.

When the multi-layered block 40 has been bonded via the adhesive layer 32 onto the outer layer 33 fixed to the base 30 and laminated thereon, the base substrate 28 is peeled off from the agglutinant layer 27 of the multi-layered block 40, as shown in FIG. 14.

In this embodiment, the release layer 5 is formed on the surface of the second support sheet 4 so that the bonding strength between the second support sheet 4 and the release layer 5 of the multi-layered unit 20 is 5 to 20 mN/cm and the agglutinant layer 27 is formed on the surface of the base substrate 28 so that the bonding strength between the agglutinant layer 27 and the base substrate 28 is 20 to 350 mN/cm and that the bonding strength between the agglutinant layer 27 and the ceramic green sheet 2 of the multi-layered unit 20 is equal to or higher than 350 mN/cm. Therefore, since the agglutinant layer 27 is formed on the surface of the base substrate 28 so that the bonding strength between the agglutinant layer 27 and the base substrate 28 is higher than the bonding strength between the second support sheet 4 and the release layer 5 of the multi-layered unit 20 and lower than the bonding strength between the agglutinant layer 27 and the ceramic green sheet 2 of the multi-layered unit 20, it is possible to easily peel off only the base substrate 28 from multi-layered block 40 laminated on the outer layer 33.

In this manner, the multi-layered block 40 including a predetermined number of the laminated multi-layered units 20 is laminated on the outer layer 33 fixed onto the base 30 via the adhesive layer 32.

Further, in accordance with the steps shown in FIGS. 8 to 12, a predetermined number of the multi-layered units 20 are laminated on the base substrate 28 fixed onto the base 30 to fabricate a multi-layered block 40 and the thus fabricated multi-layered block 40 is laminated on the multi-layered block 40 laminated on the outer layer 33 fixed onto the base 30.

Figure 15:
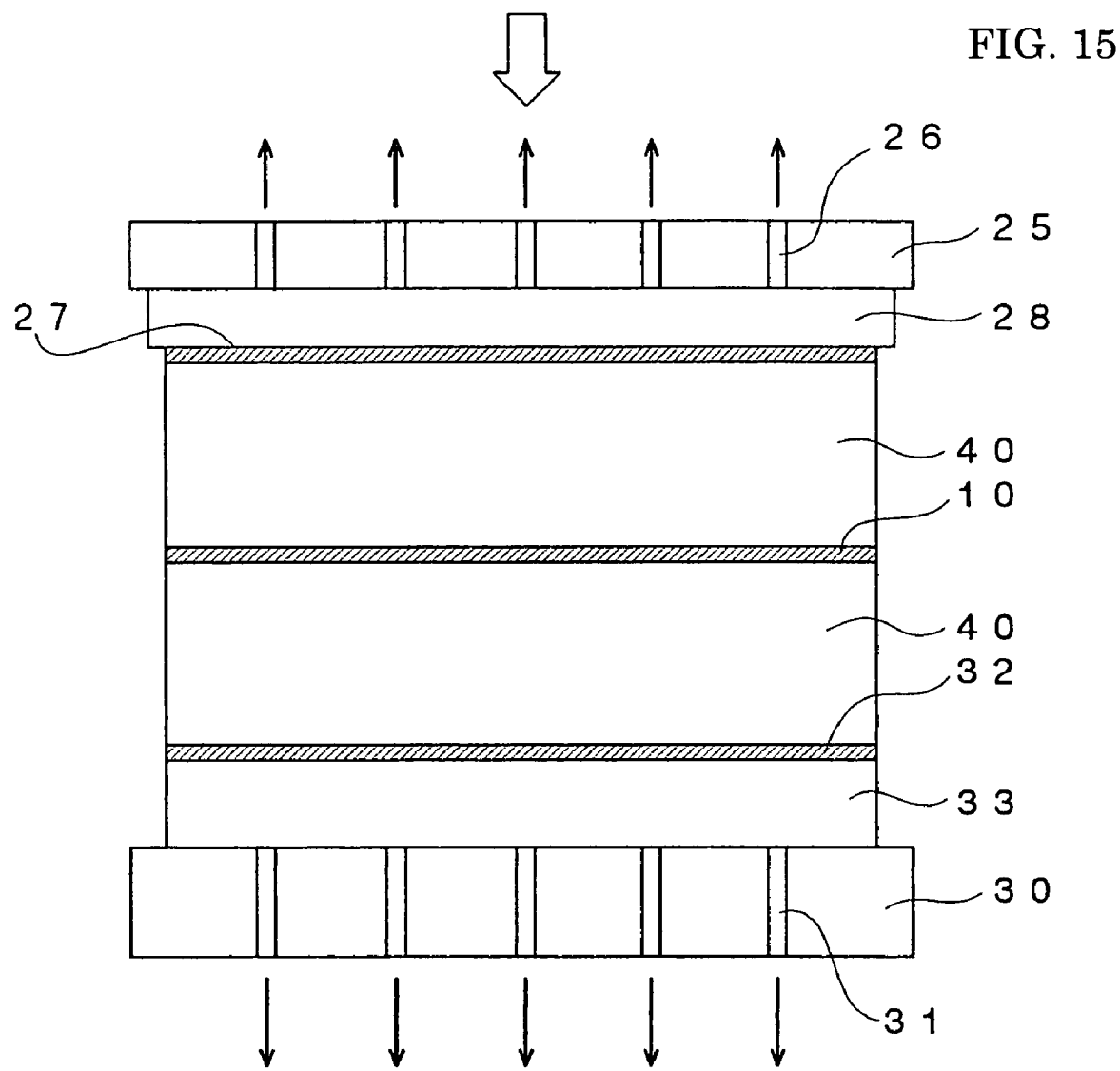
FIG. 15 is a schematic partial cross-sectional view showing a third step of a lamination process of for laminating a multi-layered block laminated on a base substrate fixed to a substrate on an outer layer of a multi-layered ceramic capacitor.

FIG. 15 is a schematic partial cross-sectional view showing a third step of a lamination process of for laminating the multi-layered block 40 laminated on the base substrate 28 fixed to the substrate 25 on the outer layer 33 of the multi-layered ceramic capacitor.

As shown in FIG. 15, the multi-layered block 40 newly laminated on the base substrate 28 sucked with air via a number of the holes 26 and fixed at a predetermined position on the substrate 25 is positioned so that the surface of the release layer 5 of the last laminated multi-layered unit 20 comes into contact with the surface of the agglutinant layer 27 of the multi-layered block 40 laminated on the outer layer 33.

Then, the suction operation with air via the number of the holes 26 is stopped and the substrate 25 is removed from the base substrate 28 supporting the multi-layered block 40.

When the substrate 25 has been removed from the base substrate 28, a pressure is applied onto the base substrate 28 using a pressing machine or the like.

In this embodiment, since the uppermost layer of the multi-layered block 40 laminated on the outer layer 33 is constituted as the agglutinant layer 27 peeled off from the base substrate 28 and remaining on the side of the multi-layered block 40, when a multi-layered block 40 is to be newly laminated on the multi-layered block 40 laminated on the outer layer 33, it is unnecessary to form an adhesive layer. Therefore, it is possible to efficiently laminate multi-layered blocks 40.

As a result, the newly laminated multi-layered block 40 is bonded onto the multi-layered block 40 laminated on the outer layer 33 fixed onto the base 30 via the agglutinant layer 27 and laminated thereon.

Figure 16:
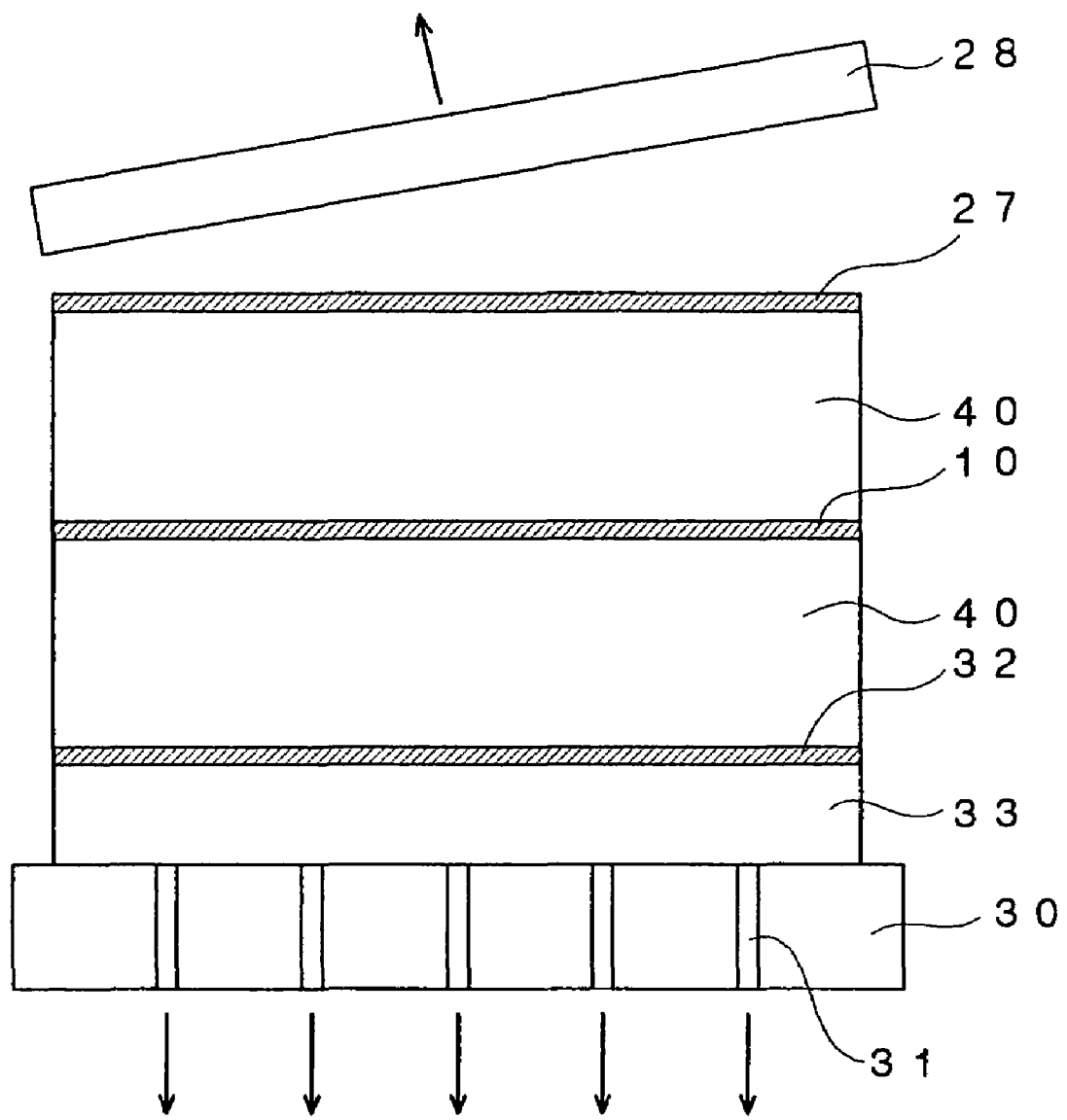
FIG. 16 is a schematic partial cross-sectional view showing a fourth step of a lamination process of for laminating a multi-layered block laminated on a base substrate fixed to a substrate on an outer layer of a multi-layered ceramic capacitor.

FIG. 16 is a schematic partial cross-sectional view showing a fourth step of a lamination process of for laminating the multi-layered block 40 laminated on the base substrate 28 fixed to the substrate 25 on the outer layer 33 of the multi-layered ceramic capacitor.

When the newly laminated multi-layered block 40 has been bonded via the agglutinant layer 27 onto the multi-layered block 40 laminated on the outer layer 33 fixed onto the base 30 and laminated thereon, the base substrate 28 is peeled off from the agglutinant layer 27 of the newly laminated multi-layered block 40, as shown in FIG. 16.

In this manner, the new multi-layered block 40 is bonded via the agglutinant layer 27 onto the multi-layered block 40 laminated on the outer layer 33 fixed onto the base 30 and is laminated thereon.

Similarly to the above, multi-layered blocks 40 each laminated on the base substrate 28 fixed onto the substrate 25 are sequentially laminated and a predetermined number of the multi-layered blocks 40, and, therefore, a predetermined number of the multi-layered units 20, are laminated on the outer layer 33 of the multi-layered ceramic capacitor.

When a predetermined number of the multi-layered units 20 have been laminated on the outer layer 33 of the multi-layered ceramic capacitor in this manner, another outer layer (not shown) is bonded onto them via an adhesive layer, thereby fabricating a laminated body including a predetermined number of the multi-layered units 20.

Then, the laminated body including the predetermined number of the multi-layered units 20 is cut to a predetermined size, thereby fabricating a number of ceramic green chips.

The thus fabricated ceramic green chips are placed in a reducing gas atmosphere so that the binder is removed therefrom and the ceramic green chips are baked.

Necessary external electrodes are then attached to the thus baked ceramic green chip, thereby manufacturing a multi-layered ceramic capacitor.

According to this embodiment, since the multi-layered unit 20 is positioned so that the surface of the agglutinant layer 27 of the base substrate 28 fixed onto the base 25 and the surface of the ceramic green sheet 2 come into contact with each other and pressure is applied to the multi-layered unit 20, whereby the multi-layered unit 20 is laminated on the base substrate 28, when a desired number of multi-layered units 20 are laminated and a multi-layered ceramic electronic component is manufactured, it is possible to effectively prevent the multi-layered units 20 from being damaged.

Further, according to this embodiment, the base substrate 28 has such surface roughness as to include per 0.01 mm$^2$ thereof not more than one protrusion that can penetrate the ceramic green sheet 2 laminated on the agglutinant layer 27 to half or more the thickness of the ceramic green sheet 2 and include per 100 mm$^2$ thereof not more than one protrusion that can completely penetrate the ceramic green sheet. Therefore, even in the case where the ceramic green sheet 2 is made thin, when a pressure is applied onto the multi-layered unit 20, thereby laminating the multi-layered unit 20 on the base substrate 28, it is possible to effectively prevent the ceramic green sheet 2 from being damaged by the protrusions formed on the surface of the base substrate 28 and short-circuit failure from occurring in a multi-layered ceramic electronic component fabricated by laminating a number of multi-layered units 20 each including a ceramic green sheet 2 and an electrode layer 6. Furthermore, according to this embodiment, the agglutinant layer 27 is formed on the surface of the base substrate 28, the multi-layered unit 20 including the release layer 5, the electrode layer 6, the spacer layer 7, the adhesive layer 10 and the ceramic green sheet 2 laminated on the second support sheet 4 is laminated on the agglutinant layer 27 formed on the surface of the base substrate 28 fixed onto the substrate 25 so that the surface of the ceramic green sheet 2 of the multi-layered unit 20 comes into contact with the surface of the agglutinant layer 27 and the agglutinant layer 27 is formed on the surface of the base substrate 28 so that the boding strength between the agglutinant layer 27 and the base substrate 28 is higher than the bonding strength between the second support sheet 4 and the release layer 5 of the multi-layered unit 20 and lower than the bonding strength between the agglutinant layer 27 and ceramic green sheet 2 of the multi-layered unit 20. Therefore, in the case of laminating a desired number of the multi-layered units 20 to manufacture a multi-layered ceramic electronic component, it is possible to effectively prevent the multi-layered units 20 from being damaged.

Moreover, according to this embodiment, since the release layer 5 is formed on the surface of the second support sheet 4 so that the bonding strength between the second support sheet 4 and the release layer 5 of the multi-layered unit 20 is 5 to 20 mN/cm and the agglutinant layer 27 is formed on the surface of the base substrate 28 so that the bonding strength between the agglutinant layer 27 and the base substrate 28 is 20 to 350 mN/cm and that the bonding strength between the agglutinant layer 27 and the ceramic green sheet 2 of the multi-layered unit 20 is equal to or higher than 350 mN/cm, the agglutinant layer 27 is formed on the surface of the base substrate 28 so that the bonding strength between the agglutinant layer 27 and the base substrate 28 is higher than the bonding strength between the second support sheet 4 and the release layer 5 of the multi-layered unit 20 and lower than the bonding strength between the agglutinant layer 27 and the ceramic green sheet 2 of the multi-layered unit 20. Therefore, when the multi-layered block 40 fabricated by laminating a predetermined number of the multi-layered units 20 on the agglutinant layer 27 of the base substrate 28 is bonded onto the adhesive layer 32 formed on the outer layer 33 of a multi-layered ceramic capacitor to be laminated thereon and the base substrate 28 is peeled off from the multi-layered block 40 laminated on the outer layer 33 in order to further laminate a multi-layered block 40 on the multi-layered block 40 laminated on the outer layer 33, since only the base substrate 28 is peeled off and the agglutinant layer 27 remains on the side of the multi-layered block 40, it is unnecessary to form an adhesive layer when a multi-layered block 40 is newly laminated on the multi-layered block 40 laminated on the outer layer 33 and it is therefore possible to efficiently laminate multi-layered blocks 40.

Further, since it is necessary to wind the first support sheet 1 around a roller when a multi-layered unit is to be manufactured, the first support sheet 1 is normally added with fillers in order to produce a predetermined friction force between itself and the roller when it is taken out from or wound around the roller. Therefore, since the surface of the first support sheet 1 is formed with protrusions, in the case of forming a ceramic green sheet having an extremely small thickness, there arises a risk of the ceramic green sheet 2 being damaged by the protrusions formed on the surface of the first support sheet 1 and short-circuit failure sometimes occurring in a multi-layered ceramic capacitor fabricated by laminating a number of multi-layered units 20 each including the ceramic green sheet 2. However, according to this embodiment, the first support sheet 1 on which a ceramic green sheet 2 is to be formed has such surface roughness as to include per 0.01 mm$^2$ thereof not more than one protrusion that can project into the ceramic green sheet 2 to be formed on the surface thereof to half or more the thickness of the ceramic green sheet 2 and include per 100 mm$^2$ thereof not more than one protrusion that can completely penetrate the ceramic green sheet 2. Therefore, even in the case of forming a ceramic green sheet 2 having an extremely small thickness on the first support sheet 1, when the ceramic green sheet 2 and the electrode and spacer layers 6, 7 are pressed onto each other via the adhesive layer 10, thereby bonding the ceramic green sheet 2 and the electrode and spacer layers 6, 7 onto each other via the adhesive layer 10, it is possible to effectively prevent the ceramic green sheet 2 from being damaged by protrusions formed on the surface of the first support sheet 1. Therefore, it is possible to effectively prevent short-circuit failure from occurring in a multi-layered ceramic capacitor fabricated by laminating a number of multi-layered units 20 each including the ceramic green sheet 2.

Moreover, since it is also necessary to wind the second support sheet 4 round a roller when a multi-layered unit is to be manufactured, the second support sheet 4 is normally added with fillers in order to produce a predetermined friction force between itself and the roller when it is taken out from or wound around the roller. Therefore, since the surface of the second support sheet 4 is formed with protrusions, when the ceramic green sheet 2, and the electrode layer 6 and the spacer layer 7 are pressed onto each other via the adhesive layer 10, thereby bonding them onto each other, there arises a risk of the ceramic green sheet 2 of being damaged by the protrusions formed on the surface of the first support sheet 1 and the protrusions formed on the surface of the first support sheet 1 and short-circuit failure sometimes occurs in a multi-layered ceramic capacitor fabricated by laminating a number of multi-layered units 20 each including the ceramic green sheet 2. However, according to this embodiment, the support sheet selected as the second support sheet 4 on the surface of which an electrode layer 6 and a spacer layer 7 are to be formed has such surface roughness as to include per 0.01 mm$^2$ thereof not more than one protrusion that can penetrate the ceramic green sheet 2 to half or more the thickness of the ceramic green sheet when the ceramic green sheet 2 and the electrode and spacer layers 6, 7 are pressed onto each other via the adhesive layer and to include per 100 mm$^2$ thereof not more than one protrusion that can completely penetrate the ceramic green sheet 2 when the ceramic green sheet 2 and the electrode layer and spacer layers 6, 7 are pressed onto each other via the adhesive layer. Therefore, even in the case of forming a ceramic green sheet 2 having an extremely small thickness on the first support sheet 1, when the ceramic green sheet 2, and the electrode and spacer layers 6, 7 are pressed onto each other via the adhesive layer 10, thereby bonding the ceramic green sheet and the electrode and spacer layers 6, 7 onto each other, it is possible to effectively prevent the ceramic green sheet 2 from being damaged by the protrusions formed on the surface of the second support sheet 4. Therefore, it is possible to effectively prevent short-circuit failure from occurring in a multi-layered ceramic capacitor fabricated by laminating a number of multi-layered units 20 each including the ceramic green sheet 2.

Furthermore, according to this embodiment, since the electrode layer 6 and the spacer layer 7 whose density is lower than that of the electrode layer 6 and whose compression ratio is higher than that of the electrode layer 6 are formed so that $t_s/t_e$ is equal to 1.1, when the electrode layer 6 and the spacer layer 7 are bonded onto the ceramic green sheet 2 via the adhesive layer 10, the spacer layer 7 is compressed by the pair of pressure rollers 17, 18 so that not only the spacer layer 7 but also the electrode layer 6 is reliably bonded onto the surface of the ceramic green sheet 2 via the adhesive layer 10. Therefore, when the second support sheet 4 is to be peeled off, it is possible to effectively prevent the electrode layer 6 from being peeled off from the ceramic green sheet 2 together with the second support sheet 4.

Hereinafter, working examples and comparative examples will be set out in order to further clarify the advantages of the present invention.

WORKING EXAMPLE 1

Preparation of a Dielectric Paste for a Ceramic Green Sheet

Dielectric powders having the following composition were prepared.

| | |
|---|---|
| $BaTiO_3$ powders ("BT-02" (Product Name) manufactured by SAKAI CHEMICAL INDUSTRY CO., LTD:) | 100 weight parts |
| $MgCO_3$ | 0.72 weight parts |
| $MnO$ | 0.13 weight parts |
| $(Ba_{0.5}Ca_{0.4})SiO_2$ | 1.5 weight parts |
| $Y_2O_3$ | 1.0 weight parts |

An organic vehicle having the following composition was added to 100 weight parts of the thus prepared dielectric powders and the resultant mixture was mixed using a ball mill for 20 hours, thereby preparing a dielectric paste for a ceramic green sheet.

| | |
|---|---|
| polyvinyl butyral resin (binder) | 6 weight parts |
| bis(2-ethylhexyl)phthalate (DOP: plasticizing agent) | 3 weight parts |
| ethyl alcohol | 78 weight parts |
| n-propyl alcohol | 78 weight parts |
| xylene | 14 weight parts |
| mineral spirit | 7 weight parts |
| dispersing agent | 0.7 weight parts |

Preparation of a Dielectric Paste for a Release Layer

A dielectric paste was prepared in the manner of preparing the dielectric paste for a ceramic green sheet except that $BaTiO_3$ powders ("BT-02" (Product Name) manufactured by SAKAI CHEMICAL INDUSTRY CO., LTD:) were used and the thus prepared dielectric paste was diluted by a mixed solution of ethyl alcohol, propyl alcohol and xylene where the mixture ratio was 42.5:42.5:15, thereby preparing a dielectric paste for a release layer.

Preparation of an Adhesive Agent Paste

An organic vehicle having the following composition was prepared and the thus obtained organic vehicle was diluted ten times by methyl ethyl ketone, thereby preparing a paste for an adhesive agent.

| | |
|---|---|
| polyvinyl butyral resin (binder) | 100 weight parts |
| bis(2-ethylhexyl)phthalate (DOP: plasticizing agent) | 50 weight parts |
| methyl ethyl ketone | 900 weight parts |

Preparation of a Paste for an Electrode Layer

A solution having the following composition was added to 100 weight parts of Ni particles having an average diameter of 0.2 μm and the resultant mixture was mixed using a ball mill for 20 hours, thereby preparing a slurry.

| | |
|---|---|
| $BaTiO_3$ powders ("BT-02" (Product Name) manufactured by SAKAI CHEMICAL INDUSTRY CO., LTD:) | 20 weight parts |
| organic vehicle | 58 weight parts |
| bis(2-ethylhexyl)phthalate (DOP: plasticizing agent) | 50 weight parts |
| terpineol | 5 weight parts |
| dispersing agent | 1 weight parts |
| acetone | 45 weight parts |

Here, the organic vehicle was prepared by dissolving 8 weight parts of polyvinyl butyral resin into 92 weight parts of terpineol.

The thus obtained slurry was heated at 40° C. and agitated to volatilize excessive acetone, thereby preparing a paste for an electrode layer.

Preparation of a Dielectric Paste for a Spacer Layer

A solution having the following composition was added to 100 weight parts of the dielectric powders used for preparing the dielectric paste for a ceramic green sheet and the resultant mixture was mixed for 20 hours; thereby preparing slurry.

| | |
|---|---|
| organic vehicle | 71 weight parts |
| polyvinyl butyral resin (binder) | 50 weight parts |
| bis(2-ethylhexyl)phthalate (DOP: plasticizing agent) | 5 weight parts |
| terpineol | 5 weight parts |
| dispersing agent | 1 weight parts |
| acetone | 64 weight parts |

Here, the organic vehicle was prepared by dissolving 8 weight parts of polyvinyl butyral resin into 92 weight parts of terpineol.

The thus obtained slurry was heated at 40° C. and agitated to volatilize excessive acetone, thereby preparing a dielectric paste for a spacer layer.

Fabrication of a Ceramic Green Sheet

The surface of a first polyethylene terephthalate film was coated using a wire bar coater with the dielectric paste for a ceramic green sheet to form a coating layer and the coating layer was dried, thereby fabricating a ceramic green sheet having a thickness of 1.5 µm.

Formation of a Release Layer, an Electrode Layer and a Spacer Layer

The surface of a second polyethylene terephthalate film was coated using a wire bar coater with the dielectric paste for a release layer to form a coating layer and the coating layer was dried, thereby forming a release layer having a thickness of 0.2 µm.

The surface of the thus formed release layer was printed using a screen printing process with the paste for an electrode layer in a predetermined pattern, thereby forming an electrode layer having a thickness of 1.0 µm.

Then, the surface of the release layer where no electrode layer was formed was printed using a screen printing process with the dielectric paste for a spacer layer in a complementary pattern to that of the electrode layer, thereby forming a spacer layer having a thickness of 1.0 µm.

Formation of an Adhesive Layer

The surface of a third polyethylene terephthalate film was coated using a wire bar coater with the adhesive agent paste, thereby forming an adhesive layer having a thickness of 0.1 µm.

Transfer of an Adhesive Layer

Using the adhering and peeling apparatus shown in FIG. 5, the adhesive layer formed on the third polyethylene terephthalate film was bonded onto the surfaces of the electrode layer and the spacer layer and the third polyethylene terephthalate film was peeled off from the adhesive layer, whereby the adhesive layer was transferred onto the surfaces of the electrode layer and the spacer layer.

The nip pressure of the pair of pressure rollers was 1 Mpa and the temperature was 50° C.

Transfer of a Ceramic Green Sheet onto the Surfaces of an Electrode Layer and a Spacer Layer Using the adhering apparatus shown in FIG. 6, the electrode and spacer layers, and the ceramic green sheet were bonded to each other via the adhesive layer transferred onto the surface of the electrode layer and the spacer layer.

The nip pressure of the pair of pressure rollers was 5 Mpa and the temperature was 100° C.

Then, the first polyethylene terephthalate film was peeled off from the ceramic green sheet, thereby obtaining a multi-layered unit including the release layer, the electrode layer, the spacer layer, the adhesive layer and the ceramic green sheet laminated on the second polyethylene terephthalate film.

Preparation of a Base Substrate

An ethyl alcohol solution containing 1.5 weight % of polyvinyl butyral and 0.75 weight % of dioctylphthalate was prepared and the surface of a sheet constituted as a polyethylene terephthalate film was coated with the ethyl alcohol solution, thereby forming an agglutinant layer having a thickness of 0.02 µm.

Then, the sheet formed with the agglutinant layer was cut to 60 mm*70 mm to fabricate a base substrate and the thus fabricated base substrate was fixed onto a base.

Lamination of Multi-layered Units

The multi-layered unit was positioned so that the surface of the ceramic green sheet of the multi-layered unit came into contact with the surface of the agglutinant layer formed on the base substrate and the pressure of 2 Mpa was applied to the multi-layered unit at a temperature of 50° C. for 5 seconds, thereby bonding and laminating the multi-layered unit onto the agglutinant layer formed on the base substrate.

Then, the second polyethylene terephthalate film was peeled off from the release layer of the multi-layered unit.

Preparation of a New Multi-layered Unit

Further, the surface of the third polyethylene terephthalate film was coated using a wire bar coater with the adhesive agent paste to form an adhesive layer having a thickness of 0.1 µm. Then, using the adhering and peeling apparatus shown in FIG. 5, the adhesive layer formed on the surface of the third polyethylene terephthalate film was bonded onto the surface of the ceramic green sheet of a multi-layered unit to be newly laminated and the third polyethylene terephthalate film was peeled off from the adhesive layer, whereby the adhesive layer was transferred onto the surface of the ceramic green sheet of the multi-layered unit to be newly laminated.

Fabrication of a Multi-layered Block

Further, the multi-layered unit to be newly laminated was positioned so that the surface of the adhesive layer transferred onto the ceramic green sheet of the multi-layered unit to be newly laminated came into contact with the surface of the release layer of the multi-layered unit laminated on the base substrate and the pressure of 2 Mpa was applied to the multi-layered unit to be newly laminated at a temperature of 50° C. for 5 seconds, thereby laminating the new multi-layered unit on the multi-layered unit laminated on the base substrate.

Afterward, the second polyethylene terephthalate film was peeled off from the release layer of the newly laminated multi-layered unit.

Similarly to the above, ten multi-layered units in total were laminated on the base substrate, thereby fabricating a multi-layered block.

Further, similarly to the above, five multi-layered blocks each including ten multi-layered units were fabricated.

Fabrication of a Ceramic Green Chip

An adhesive layer having a thickness of about 50 µm was formed on an outer layer constituting a lid portion of a multi-layered ceramic capacitor. Then, the multi-layered block was positioned so that the ceramic green sheet came into contact with the surface of the adhesive layer and the pressure of 2 Mpa was applied to the multi-layered block at a temperature of 50° C. for 5 seconds, thereby laminating the multi-layered block on the outer layer.

Afterward, the base substrate was peeled off from the multi-layered block.

Further, an adhesive layer having a thickness of about 50 µm was formed on the multi-layered block laminated on the outer layer. Then, a multi-layered block to be newly laminated was positioned so that the ceramic green sheet of the new multi-layered block came into contact with the surface of the adhesive layer formed on the multi-layered block laminated on the outer layer and the pressure of 2 Mpa was applied to the new multi-layered block at a temperature of 50° C. for 5 seconds, thereby laminating the new multi-layered block on the multi-layered block laminated on the outer layer.

Similarly to the above, five multi-layered blocks in total were laminated on the outer layer. Further, an adhesive layer having a thickness of about 50 µm was formed on the uppermost multi-layered block and the outer layer constituting a lid portion of a multi-layered ceramic capacitor was bonded onto the adhesive layer and laminated on the multi-layered blocks.

The thus obtained laminated body including fifty multi-layered units was pressed under a pressure of 100 Mpa at a temperature of 40° C. for 30 seconds to be subjected to the press forming and was then cut using a dicing machine to a predetermined size, thereby fabricating a ceramic green chip.

Fabrication of a Multi-layered Ceramic Capacitor

The thus fabricated ceramic green chip was processed under the following conditions in a nitrogen gas atmosphere to remove the binder.

Temperature rising rate: 50° C./hour
Holding temperature: 400° C.
Holding time period: 2 hours After removing the binder, the ceramic green chip was processed and baked under the following conditions in a mixed gas atmosphere of a nitrogen gas and a hydrogen gas whose dew point was controlled to 20° C.

Temperature rising rate: 300° C./hour
Holding temperature: 1240° C.
Holding time period: 3 hours
Cooling rate: 300° C./hour The thus baked ceramic green chip was subjected to an annealing processing under the following conditions in an atmosphere of a nitrogen gas whose dew point was controlled to 20° C.

Holding time period: 2 hours
Cooling rate: 300° C./hour

End surfaces of the thus obtained sintered body were polished and a paste for a terminal electrode was applied thereto and fired under the following conditions in a mixed gas atmosphere of a nitrogen gas and a hydrogen gas whose dew point was controlled to 20° C., thereby forming terminal electrodes.

Temperature rising rate: 500° C./hour
Holding temperature: 700° C.
Holding time period: 10 minutes
Cooling rate: 500° C./hour Further, the terminal electrodes were plated to fabricate a sample of a multi-layered ceramic capacitor.

The thus fabricated sample of the multi-layered ceramic capacitor had fifty laminated layers of the ceramic green sheets and had a length of 1.6 mm and a width of 0.8 mm.

Similarly to the above, one hundred samples of the multi-layered ceramic capacitors were fabricated in total.

Measurement of Short-circuit Ratio

Whether or not short-circuit failure occurred in each of theses one hundred multi-layered ceramic capacitor samples was measured using a high resistance meter.

When the thus measured resistance value of a sample was equal to or lower than 10 MΩ, it was judged that short-circuit failure occurred in the sample and the ratio (%) of the number of samples in which short-circuit failure occurred to the total number of samples was calculated to determine short-circuit ratio of these samples.

The short-circuit-ratio of these samples was found to be 0%.

WORKING EXAMPLE 2

One hundred multi-layered ceramic capacitors were fabricated in the manner in Working Example 1 except that the base substrate on which the agglutinant layer was to be formed was formed of a polyethylene terephthalate film whose surface had only one protrusion having a height equal to or higher than 0.5 μm and lower that 1 μm per 0.01 mm² thereof and only one protrusion having a height equal to or higher than 1 μm per 100 mm² thereof, and the short-circuit ratio of the multi-layered ceramic capacitors was determined. The surface roughness of the polyethylene terephthalate film used for forming the base substrate was ascertained by observing the surface of the polyethylene terephthalate film using a laser 3D profile microscope "VK-8550" (product name) manufactured by Keyence Corporation. The short-circuit ratio of the multi-layered ceramic capacitors was found to be 20%.

WORKING EXAMPLE 3

One hundred multi-layered ceramic capacitors were fabricated in the manner in Working Example 1 except that the ceramic green sheet was formed so as to have a thickness of 2 μm and the short-circuit ratio of the multi-layered ceramic capacitors was determined. The short-circuit ratio of the multi-layered ceramic capacitors was found to be 0%.

WORKING EXAMPLE 4

One hundred multi-layered ceramic capacitors were fabricated in the manner in Working Example 1 except that the ceramic green sheet was formed so as to have a thickness of 2 μm and the base substrate on which the agglutinant layer was to be formed was formed of a polyethylene terephthalate film whose surface had only one protrusion having a height equal to or higher than 0.5 μm and lower that 1 μm per 0.01 mm² thereof and only one protrusion having a height equal to or higher than 1 μm per 100 mm² thereof, and the short-circuit ratio of the multi-layered ceramic capacitors was determined. The surface roughness of the polyethylene terephthalate film used for forming the base substrate was ascertained by observing the surface of the polyethylene terephthalate film using a laser 3D profile microscope "VK-8550" (product name) manufactured by Keyence Corporation. The short-circuit ratio of the multi-layered ceramic capacitors was found to be 10%.

COMPARATIVE EXAMPLE 1

One hundred multi-layered ceramic capacitors were fabricated in the manner in Working Example 1 except that the base substrate on which the agglutinant layer was to be formed was formed of a polyethylene terephthalate film whose surface had two protrusions having a height equal to or higher than 0.5 μm and lower that 1 μm per of 0.01 mm² thereof and two protrusions having a height equal to or higher than 1 μm per 100 mm² thereof, and the short-circuit ratio of the multi-layered ceramic capacitors was determined. The surface roughness of the polyethylene terephthalate film used for forming the base substrate was ascertained by observing the surface of the polyethylene terephthalate film using a laser 3D profile microscope "VK-8550" (product name) manufactured by Keyence Corporation. The short-circuit ratio of the multi-layered ceramic capacitors was found to be 40%.

COMPARATIVE EXAMPLE 2

One hundred multi-layered ceramic capacitors were fabricated in the manner in Working Example 1 except that the base substrate on which the agglutinant layer was to be formed was formed of a polyethylene terephthalate film whose surface had six protrusions having a height equal to or higher than 0.5 μm and lower that 1 μm per 0.01 mm² thereof and five protrusions having a height equal to or higher than 1 μm per 100 mm² thereof, and the short-circuit ratio of the multi-layered ceramic capacitors was determined. The surface roughness of the polyethylene terephthalate film used for forming the base substrate was ascertained by observing the surface of the polyethylene terephthalate film using a laser 3D profile microscope "VK-8550" (Product Name) manufactured by Keyence Corporation. The short-circuit ratio of the multi-layered ceramic capacitors was found to be 100%.

From Working Examples 1 and 2 and the Comparative Examples 1 and 2, it was found that in the case where the surface of the base substrate on which the multi-layered unit was to be formed had two or more protrusions that could penetrate the ceramic green sheet to be formed on thereon to half or more the thickness of the ceramic green sheet per 0.01 mm² thereof and where the surface of the base substrate had two or more protrusions which could completely penetrate the ceramic green sheet per 100 mm² thereof, the ceramic green sheet was damaged by the protrusions formed on the base substrate and the short-circuit ratio of the multi-layered ceramic capacitor fabricated by laminating the multi-layered units was high. On the other hand, it was found that in the case where the base substrate on which a multi-layered unit was to be formed had such surface roughness as to include per 0.01 mm² thereof not more one or less protrusion that could project into the ceramic green sheet to be formed on thereon to half or more the thickness of the ceramic green sheet and include per 100 mm² thereof not more than one protrusion that could completely penetrate the ceramic green sheet, it was possible to prevent the ceramic green sheet from being damaged by the protrusion formed on the base substrate and markedly decrease short-circuit ratio of the multi-layered ceramic capacitor fabricated by laminating the multi-layered units.

The present invention has thus been shown and described with reference to a specific embodiment. However, it should be noted that the present invention is in no way limited to the details of the described arrangements but changes and modifications may be made without departing from the scope of the appended claims.

For example, in the above described embodiment and working examples, the multi-layered ceramic capacitor is fabricated by bonding the adhesive layer 10 formed on the surface of the third support sheet 9 onto the surfaces of the electrode layer 6 and the spacer layer 7 formed on the surface of the second support sheet 4, peeling off the third support sheet 9 from the adhesive layer 10, bonding the ceramic green sheet 2, and the electrode layer 6 and the spacer layer 7 onto each other via the adhesive layer 10, peeling off the first support sheet 1 from the ceramic green sheet 2, thereby fabricating the multi-layered unit 20, positioning the multi-layered unit 20 so that the surface of the ceramic green sheet 2 comes into contact with the surface of the agglutinant layer 27 formed on the base substrate 28, applying pressure onto the multi-layered unit 20, bonding the ceramic green sheet 2 of the multi-layered unit 20 onto the agglutinant layer 27, laminating the multi-layered unit 20 on the base substrate 28, peeling off the second support sheet 4 from the release layer 5 of the multi-layered unit 20, further laminating a new multi-layered unit 20 in which an adhesive layer 10 is transferred onto a ceramic green sheet 2 on the surface of the release layer 5 of the multi-layered unit 20 laminated on the base substrate 28, peeling off the second support sheet 4 from the release layer 5 of the newly laminated multi-layered unit 20, laminating a desired number of multi-layered units 20 on the release layer 5 of the multi-layered unit 20 laminated on the base substrate 28 in a similar manner, thereby fabricating a multi-layered block 40, laminating the multi-layered block 40 on the outer layer 33 fixed to the base 30 so that the release layer 5 of the multi-layered block 40 is bonded onto the adhesive layer 32 formed on the outer layer 33, peeling off the base substrate 28 from the ceramic green sheet 2 of the multi-layered block 40, and further laminating a desired number of multi-layered blocks 40 on the release layer 5 of the multi-layered block 40 laminated on the outer layer 33 in a similar manner. However, a multi-layered ceramic capacitor may instead be fabricated by bonding the adhesive layer 10 formed on the surface of the third support sheet 9 onto the surfaces of the ceramic green sheet 2 formed on the first support sheet 1, peeling off the third support sheet 9 from the adhesive layer 10, bonding the ceramic green sheet 2, and the electrode layer 6 and the spacer layer 7 onto each other via the adhesive layer 10, peeling off the second support sheet 4 from the electrode layer 6 and the spacer layer 7, thereby fabricating the multi-layered unit 20, positioning the multi-layered unit 20 so that the surface of the release layer 5 comes into contact with the surface of the agglutinant layer 27 formed on the base substrate 28, applying pressure onto the multi-layered unit 20, bonding the release layer 5 of the multi-layered unit 20 onto the agglutinant layer 27, laminating the multi-layered unit 20 on the base substrate 28, peeling off the first support sheet 1 from the ceramic green sheet 2 of the multi-layered unit 20, further laminating a new multi-layered unit 20 in which an adhesive layer 10 is transferred onto a release layer 5 on the surface of the ceramic green sheet 2 of the multi-layered unit 20 laminated on the base substrate 28, peeling off the first support sheet 1 from the ceramic green sheet 2 of the newly laminated multi-layered unit 20, laminating a desired number of multi-layered units 20 on the ceramic green sheet 2 of the multi-layered unit 20 laminated on the base substrate 28 in similar manners, thereby fabricating a multi-layered block 40, laminating the multi-layered block 40 on the outer layer 33 fixed to the base 30 so that the ceramic green sheet 2 of the multi-layered block 40 is bonded onto the adhesive layer 32 formed on the outer layer 33, peeling off the base substrate 28 from the release layer 5 of the multi-layered block 40, and further laminating a desired number of multi-layered blocks 40 on the ceramic green sheet 2 of the multi-layered block 40 laminated on the outer layer 33 in a similar manner.

In this case, in order to prevent the ceramic green sheet 2 from being damaged by protrusions formed on the third support substrate 9, it is preferable to employ as the third support sheet 9 a support sheet having such roughness as to include per of 0.01 mm² thereof not more than one protrusion that can penetrate the ceramic green sheet 2 to half or more the thickness of the ceramic green sheet when the adhesive layer 10 is transferred onto the ceramic green sheet 2 and include per 100 mm² thereof not more than one protrusion that can completely penetrate the ceramic green sheet when the adhesive layer 10 is transferred onto the ceramic green sheet 2.

Further, in the above described embodiment, the multi-layered unit 20 is fabricated by bonding the adhesive layer 10 formed on the surface of the third support sheet 9 onto the surfaces of the electrode layer 6 and the spacer layer 7 formed on the surface of the second support sheet 4, peeling off the third support sheet 9 from the adhesive layer 10, bonding the ceramic green sheet 2, and the electrode layer 6 and the spacer layer 7 onto each other via the adhesive layer 10. However, it is not absolutely necessary to fabricate a multi-layered unit 20 by bonding the adhesive layer 10 formed on the surface of the third support sheet 9 onto the surfaces of the electrode layer 6 and the spacer layer 7 formed on the surface of the second support sheet 4, peeling off the third support sheet 9 from the adhesive layer 10, bonding the ceramic green sheet 2, and the electrode layer 6 and the spacer layer 7 onto each other via the adhesive layer 10. It is possible instead to apply a dielectric paste onto the surfaces of the electrode layer 6 and the spacer layer 7 to form a ceramic green sheet 2 after the electrode layer 6 and the spacer layer 7 have been dried or it is also possible to print the surface of the ceramic green sheet 2 formed on the first support sheet 1 with an electrode paste, thereby forming an electrode layer 6, and print the surface of the ceramic green sheet 2 with a dielectric paste, thereby forming a spacer layer 7.

Furthermore, in the above described embodiment, in order to prevent the ceramic green sheet 2 from being damaged by the protrusions formed on the surface of the first support sheet 1, the support sheet used as the first support sheet 1 is made to have such surface roughness as to include per 0.01 mm² thereof not more than one protrusion that can penetrate the ceramic green sheet 2 to be formed on the surface thereof to half or more the thickness of the ceramic green sheet 2 and include per 100 mm² thereof not more than one protrusion that can completely penetrate the ceramic green sheet 2. However, it is not absolutely necessary to use as the first support sheet 1 a support sheet whose surface has such roughness as to include per 0.01 mm² thereof not more than one protrusion that can penetrate the ceramic green sheet 2 to be formed on the surface thereof to half or more the thickness of the ceramic green sheet 2 and include per 100 mm² thereof not more than one protrusion that can completely penetrate the ceramic green sheet 2.

Moreover, in the above described embodiment, in order to prevent the ceramic green sheet 2 from being damaged by the protrusions formed on the surface of the second support sheet 4, the support sheet used as the second support sheet 4 is made to have such surface roughness as to include per 0.01 mm² thereof not more than one protrusion that can penetrate the ceramic green sheet 2 to half or more the thickness of the ceramic green sheet when the electrode and spacer layers 6, 7 and the ceramic green sheet 2 are pressed onto each other via an adhesive layer 10 and include per 100 mm² thereof not more than one protrusion that can completely penetrate the ceramic green sheet 2 when the electrode and spacer layers 6, 7 and the ceramic green sheet 2 are pressed onto each other via the adhesive layer 10. However, it is not absolutely necessary to use as the second support sheet 4 a support sheet whose surface has such roughness as to include per 0.01 mm² thereof not more than one protrusion that can penetrate the ceramic green sheet 2 to half or more the thickness of the ceramic green sheet when the electrode and spacer layers 6, 7 and the ceramic green sheet 2 are pressed onto each other via an adhesive layer 10 and include per 100 mm² thereof not more than one or less protrusion that can completely penetrate the ceramic green sheet 2 when the electrode and spacer layers 6, 7 and the ceramic green sheet 2 are pressed onto each other via the adhesive layer 10.

Further, in the above described embodiment, the electrode layer 6 and the spacer layer 7 are formed on the release layer 5 so that $t_s/t_e$ is equal to 1.1, where $t_s$ is the thickness of the spacer layer 7 and $t_e$ is the thickness of the electrode layer 6. However, it is sufficient to form an electrode layer 6 and a spacer layer 7 on the release layer 5 so that $t_s/t_e$ is equal to or larger than 0.7 and equal to or smaller than 1.2, preferably equal to or larger than 0.8 and equal to or smaller than 1.2 and more preferably equal to or larger than 0.9 and equal to or smaller than 1.2, and it is not absolutely necessary to form the electrode layer 6 and the spacer layer 7 on the release layer 5 so that $t_s/t_e$ is equal to 1.1.

Moreover, in the above described embodiment, the electrode layer 6 and the spacer layer 7 are formed on the release layer 5. However, it is not absolutely necessary to form the electrode layer 6 and the spacer layer 7 on the release layer 5 and only the electrode layer 6 can be formed on the release layer 5 without forming the spacer layer 7 on the release layer 5.

Further, although in the above described embodiment the adhesive layer 10 contains the surfactant, it is not absolutely necessary for the adhesive layer 10 to contain a surfactant.

Furthermore, in the above described embodiment, the agglutinant layer 27 contains an imidazoline system surfactant in an amount of 0.01 weight % to 15 weight % of the binder. However, it is not absolutely necessary for the agglutinant layer 27 to contain an imidazoline system surfactant in an amount of 0.01 weight % to 15 weight % of the binder. The agglutinant layer 27 may contain an ampholytic surfactant such as a polyalkylene glycol derivative system surfactant, a carboxylic acid amidine salt system surfactant and the like, or it may contain a surfactant other than an ampholytic surfactant. Further, it is not absolutely necessary for an agglutinant layer 27 to contain a surfactant.

Moreover, in the above described embodiment, the ceramic green sheet 2 is bonded onto the surfaces of the electrode layer 6 and the spacer layer 7 via the adhesive layer 10 using the adhering apparatus shown in FIG. 6 and the third support sheet 9 is peeled off from the adhesive layer However, it is possible to bond the ceramic green sheet 2 onto the surfaces of the electrode layer 6 and the spacer layer 7 via the adhesive layer 10 and peel off the third support sheet 9 from the adhesive layer 10 using the adhering and peeling apparatus shown in FIG. 5.

According to the present invention, it is possible to provide a method for manufacturing a multi-layered ceramic electronic component which can reliably prevent a multi-layered unit including a ceramic green sheet and an electrode layer from being damaged and efficiently laminate a desired number of the multi-layered units, thereby manufacturing the multi-layered ceramic electronic component.

The invention claimed is:

1. A method for manufacturing a multi-layered ceramic electronic component comprising:
    positioning a multi-layered unit formed on a support sheet, wherein the multi-layered unit includes a release layer, an electrode layer and a ceramic green sheet, the electrode layer positioned between the release layer and the ceramic green sheet, so that a surface of the ceramic green sheet of the multi-layered unit comes into contact with a surface of an agglutinant layer formed on a base substrate;
    pressing the multi-layered unit toward the base substrate; and
    laminating the multi-layered unit on the base substrate, wherein the base substrate has such surface roughness as to include per 0.01 mm² thereof not more than one protrusion that can penetrate the ceramic green sheet of the multi-layered unit laminated on the base substrate to half or more a thickness of the ceramic green sheet and include per 100 mm² thereof not more than one protrusion that can completely penetrate the ceramic green sheet.

2. The method for manufacturing a multi-layered ceramic electronic component in accordance with claim 1, wherein the agglutinant layer is formed on a surface of the base substrate in such a manner that a bonding strength between the agglutinant layer and the base substrate is higher than a bonding strength between the support sheet and the release layer and lower than a bonding strength between the agglutinant layer and the ceramic green sheet.

3. The method for manufacturing a multi-layered ceramic electronic component in accordance with claim 2, wherein the agglutinant layer has a thickness of 0.01 μm to 0.3 μm.

4. The method for manufacturing a multi-layered ceramic electronic component in accordance with claim 2, wherein the agglutinant layer contains a binder belonging to a same binder group as that of a binder contained in the ceramic green sheet.

5. The method for manufacturing a multi-layered ceramic electronic component in accordance with claim 2, wherein the agglutinant layer contains a plasticizing agent belonging to a same binder group as that of a plasticizing agent contained in the ceramic green sheet.

6. The method for manufacturing a multi-layered ceramic electronic component in accordance with claim 2, wherein the agglutinant layer contains dielectric particles having a same composition as that of dielectric particles contained in the ceramic green sheet.

7. The method for manufacturing a multi-layered ceramic electronic component in accordance with claim 2, wherein the base substrate is formed of a plastic material selected from a group consisting of polyethylene, polypropylene, polycarbonate, polyphenylene ether and polyethylene terephthalate.

8. The method for manufacturing a multi-layered ceramic electronic component in accordance with claim 2, wherein the ceramic green sheet has said thickness equal to or thinner than 3 μm.

9. The method for manufacturing a multi-layered ceramic electronic component in accordance with claim 1, wherein the agglutinant layer has a thickness of 0.01 μm to 0.3 μm.

10. The method for manufacturing a multi-layered ceramic electronic component in accordance with claim 1, wherein the agglutinant layer contains a binder belonging to a same binder group as that of a binder contained in the ceramic green sheet.

11. The method for manufacturing a multi-layered ceramic electronic component in accordance with claim 1, wherein the agglutinant layer contains a plasticizing agent belonging to a same binder group as that of a plasticizing agent contained in the ceramic green sheet.

12. The method for manufacturing a multi-layered ceramic electronic component in accordance with claim 1, wherein the agglutinant layer contains dielectric particles having a same composition as that of dielectric particles contained in the ceramic green sheet.

13. The method for manufacturing a multi-layered ceramic electronic component in accordance with claim 1, wherein the base substrate is formed of a plastic material selected from a group consisting of polyethylene, polypropylene, polycarbonate, polyphenylene ether and polyethylene terephthalate.

14. The method for manufacturing a multi-layered ceramic electronic component in accordance with claim 1, wherein the ceramic green sheet has said thickness equal to or thinner than 3 μm.

* * * * *